(12) United States Patent
Kato

(10) Patent No.: US 12,546,604 B2
(45) Date of Patent: Feb. 10, 2026

(54) INFORMATION PROCESSING DEVICE, CONTROL METHOD, PROGRAM, AND STORAGE MEDIUM

(71) Applicants: PIONEER CORPORATION, Tokyo (JP); PIONEER SMART SENSING INNOVATIONS CORPORATION, Tokyo (JP)

(72) Inventor: Masahiro Kato, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 0 days.

(21) Appl. No.: 18/689,250

(22) PCT Filed: Oct. 14, 2021

(86) PCT No.: PCT/JP2021/038066
§ 371 (c)(1),
(2) Date: Mar. 5, 2024

(87) PCT Pub. No.: WO2023/062782
PCT Pub. Date: Apr. 20, 2023

(65) Prior Publication Data
US 2024/0369365 A1 Nov. 7, 2024

(51) Int. Cl.
*G01C 21/16* (2006.01)
*G01C 21/00* (2006.01)
(Continued)

(52) U.S. Cl.
CPC ......... *G01C 21/1652* (2020.08); *G01C 21/12* (2013.01); *G01C 21/3691* (2013.01);
(Continued)

(58) Field of Classification Search
CPC .......... G01C 21/12; G01C 21/3691; G01C 21/3844; G01C 21/3848; G01C 21/3852; G01C 15/00; G09B 29/10; G08G 1/042
(Continued)

(56) References Cited

U.S. PATENT DOCUMENTS

| | | | | |
|---|---|---|---|---|
| 8,332,149 | B2 * | 12/2012 | Oohashi | G01C 21/188 701/532 |
| 8,396,659 | B2 * | 3/2013 | Ando | G01C 21/30 701/472 |

(Continued)

FOREIGN PATENT DOCUMENTS

| | | | | |
|---|---|---|---|---|
| CN | 111033426 | A | * 4/2020 | ............ G05D 1/024 |
| CN | 118816891 | A | * 10/2024 | ........... G01C 21/165 |

(Continued)

OTHER PUBLICATIONS

Varbla, Sander, et al. "Treatment of tide gauge time series and marine GNSS measurements for vertical land motion with relevance to the implementation of the Baltic Sea Chart Datum 2000." Remote Sensing 14.4 (2022): 920. (Year: 2022).*

(Continued)

*Primary Examiner* — Cuong H Nguyen
(74) *Attorney, Agent, or Firm* — Procopio, Cory, Hargreaves & Savitch LLP

(57) ABSTRACT

An information processing device includes a predicted position acquisition means, an estimated position calculation means, a reliability calculation means, and a velocity calculation means. The predicted position acquisition means acquires a predicted position of a ship. The estimated position calculation means calculates an estimated position of the ship in which the predicted position is updated, based on a matching between data based on an output of an external sensor provided on the ship and map data. The reliability calculation means calculates a reliability of the (Continued)

matching. The velocity calculation means calculates a velocity of the ship at a first process time based on the estimated position at the first process time, an estimated position at a second process time immediately before the first process time, and a time constant set depending on at least the reliability.

9 Claims, 32 Drawing Sheets

(51) Int. Cl.
    *G01C 21/12*     (2006.01)
    *G01C 21/36*     (2006.01)
    *G01S 17/93*     (2020.01)

(52) U.S. Cl.
    CPC ..... *G01C 21/3848* (2020.08); *G01C 21/3844* (2020.08); *G01C 21/3852* (2020.08); *G01S 17/93* (2013.01)

(58) Field of Classification Search
    USPC .......................................... 701/532–533, 411
    See application file for complete search history.

(56) References Cited

U.S. PATENT DOCUMENTS

| | | | | |
|---|---|---|---|---|
| 10,838,076 | B2 * | 11/2020 | Onomura | G01S 19/49 |
| 11,175,647 | B2 * | 11/2021 | Tanaka | G05B 19/416 |
| 11,204,250 | B2 * | 12/2021 | Kim | G06N 20/00 |
| 2010/0217522 | A1 * | 8/2010 | Ando | G01S 19/49 |
| | | | | 701/532 |
| 2014/0309841 | A1 | 10/2014 | Hara et al. | |
| 2016/0269006 | A1 * | 9/2016 | Itakura | H03K 5/1532 |
| 2020/0271454 | A1 | 8/2020 | Kato | |
| 2022/0291686 | A1 | 9/2022 | Yoshimura | |
| 2024/0369365 | A1 * | 11/2024 | Kato | G01S 17/93 |
| 2025/0277901 | A1 * | 9/2025 | Smits | G01S 7/40 |

FOREIGN PATENT DOCUMENTS

| | | | | |
|---|---|---|---|---|
| CN | 118913312 A | * | 11/2024 | ........... G01C 21/203 |
| EP | 2224209 A2 | * | 9/2010 | ............. G01S 19/49 |
| EP | 2224210 A2 | * | 9/2010 | ............. G01C 21/30 |
| JP | 2007-010554 A | | 1/2007 | |
| JP | 2009-229204 A | | 10/2009 | |
| JP | 2010197278 A | * | 9/2010 | ............. G01S 19/49 |
| JP | 5051550 B2 | * | 10/2012 | ............. G01S 19/49 |
| JP | 2013-178206 A | | 9/2013 | |
| JP | 2016-188806 A | | 11/2016 | |
| JP | 2021-018639 A | | 2/2021 | |
| WO | 2013/076829 A1 | | 5/2013 | |
| WO | 2018/221453 A1 | | 12/2018 | |
| WO | WO-2020182591 A1 | * | 9/2020 | ........... B60W 60/00 |
| WO | 2021/065594 A1 | | 4/2021 | |

OTHER PUBLICATIONS

Bu, Jinwei, et al. "Ocean remote sensing using spaceborne GNSS-reflectometry: A review." IEEE Journal of Selected Topics in Applied Earth Observations and Remote Sensing 17 (2024): 13047-13076. (Year: 2024).*

Perez, Borja Carrillo. "Real-time ship recognition and georeferencing for the improvement of maritime situational awareness." arXiv preprint arXiv:2410.04946 (2024). (Year: 2024).*

Womack, Ashleigh. "An investigation of wind-and wave-driven dynamics in Antarctic sea ice from multiple types of buoy arrays." (2024). (Year: 2024).*

Patent Cooperation Treaty, International Search Report, Application No. PCT/JP2021/038066, dated Jan. 11, 2022, in 6 pages.

European Patent Office, European Search Report issued on the corresponding European Patent Application. No. 21960639.9 on Jun. 30, 2025, in 10 pages.

* cited by examiner

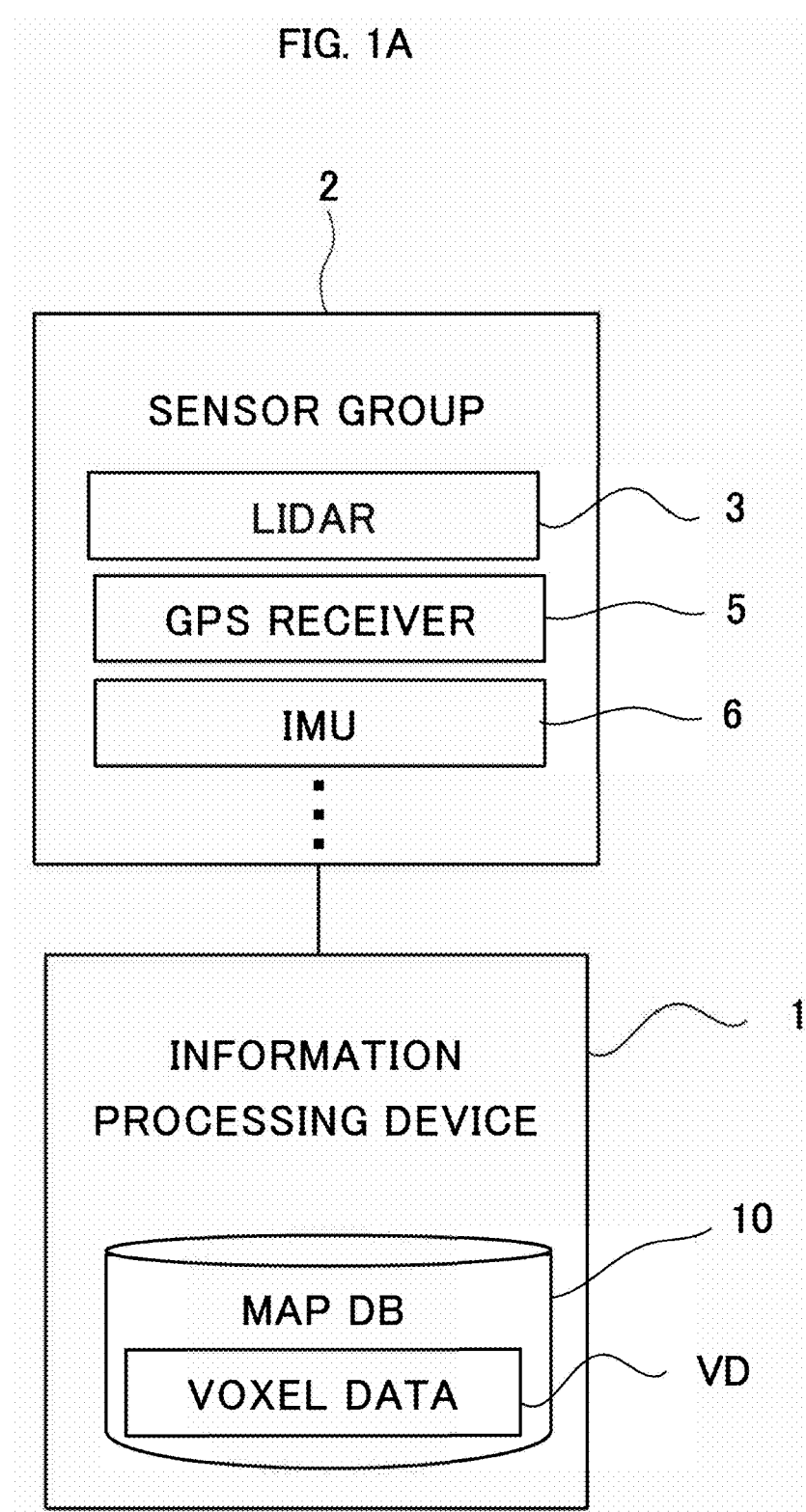

FIG. 5
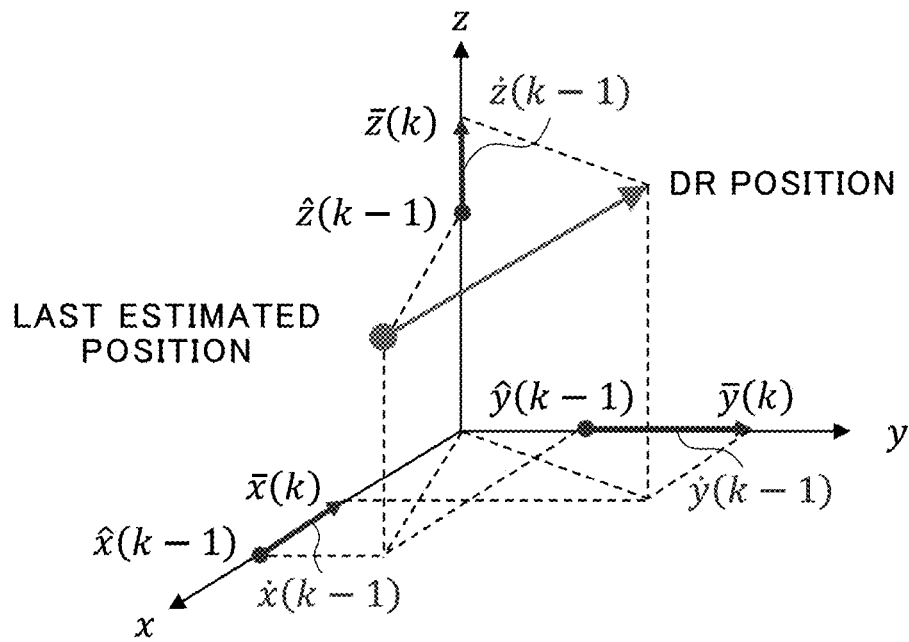
PERFORM NDT SCAN MATCHING
WITH DR POSITION AS INITIAL VALUE
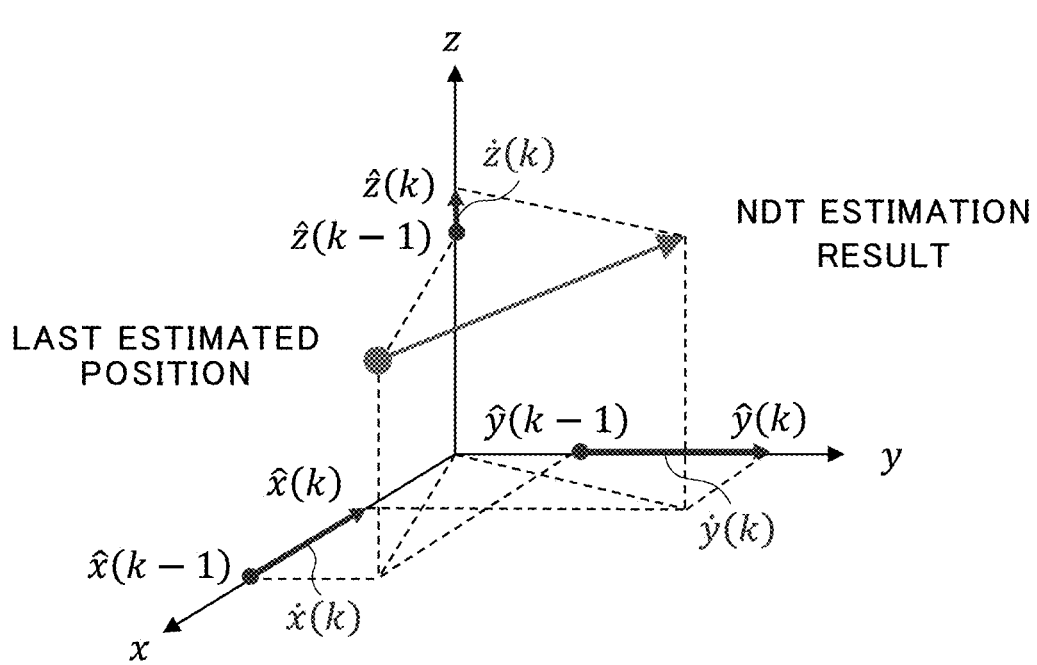

—————  $NRI = \dfrac{NRV}{\sqrt{1 + (NRV)^2}}$

— ·· —  $NRI = \dfrac{2}{1 + exp(-NRV)} - 1$

— — —  $NRI = \dfrac{arctan(NRV)}{\dfrac{\pi}{2}}$

— · — ·  $NRI = 1 - exp(-NRV)$

———— $NRI = \dfrac{NRV}{\sqrt{1+(NRV)^2}}$

— ·· — · $NRI = \dfrac{2}{1+exp(-NRV)} - 1$

— — — $NRI = \dfrac{arctan(NRV)}{\dfrac{\pi}{2}}$

— · — · · $NRI = 1 - exp(-NRV)$

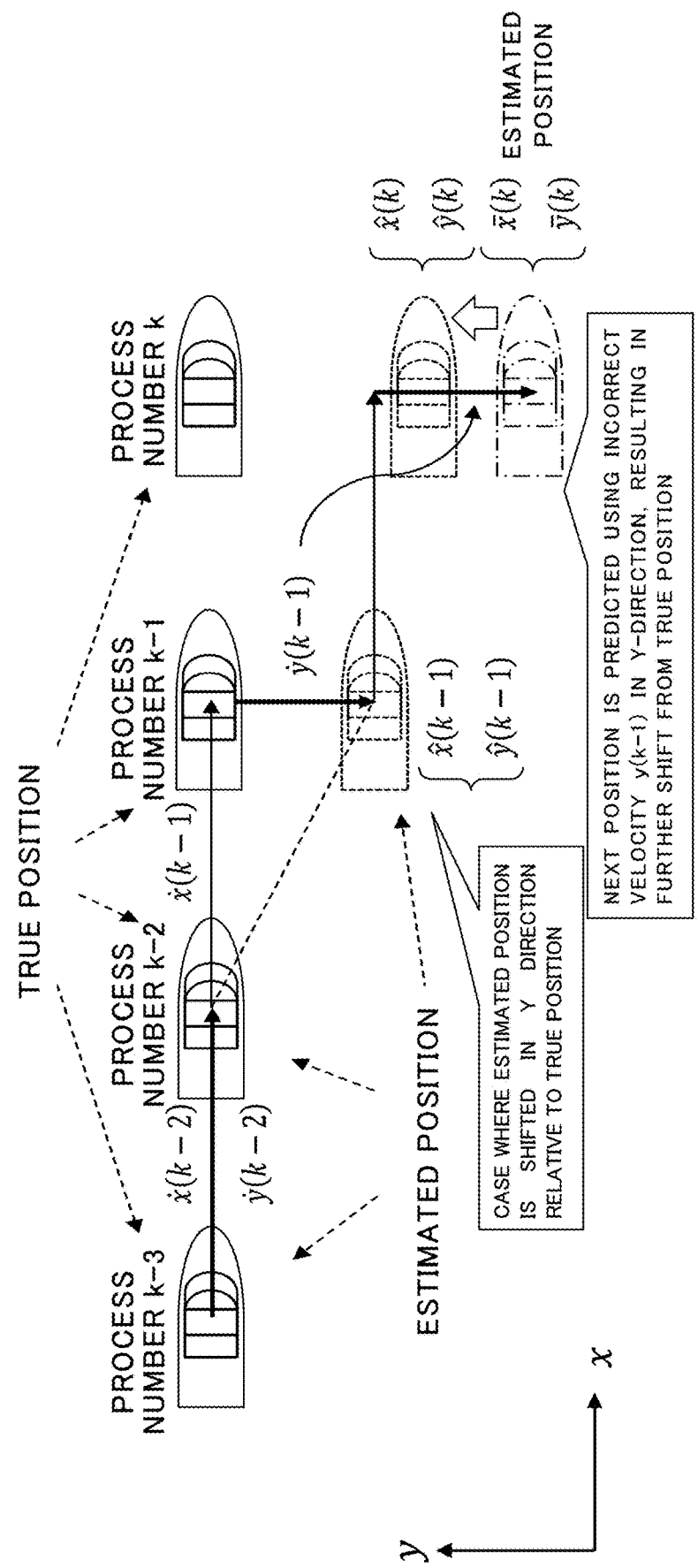

ERORR [m] IN HEIGHT DIRECTION

ERROR [m] IN YAW ANGLE

NUMBER OF MEASUREMENT POINTS BEFORE DOWN-SAMPLING

DOWN-SAMPLING SIZE [M]

TARGET SHIP

INFORMATION PROCESSING DEVICE, CONTROL METHOD, PROGRAM, AND STORAGE MEDIUM

CROSS-REFERENCE TO RELATED APPLICATIONS

This application is the US National Stage of International Patent Application PCT/JP2021/038066, filed on Oct. 14, 2021, the contents of which are incorporated herein by reference.

TECHNICAL FIELD

The present disclosure relates to a self-position estimation of a ship.

BACKGROUND ART

A technique of estimating a self-position of a moving object by collating (matching) shape data of a peripheral object measured using a measurement device such as a laser scanner with map information in which a shape of the peripheral object is recorded in advance has been known. For instance, Patent Document 1 discloses an autonomous mobility system which to determines whether a detected object in a voxel obtained by dividing a space with a predetermined rule is a stationary object or a moving object, and performs matching the map information and measured data with respect to the voxel where the stationary object is present. Furthermore, Patent Document 2 discloses a scan matching method for performing a self-position estimation by matching voxel data including an average vector and a covariance matrix of the stationary object for each voxel and point cloud data output from the lidar.

PRECEDING TECHNICAL REFERENCES

Patent Document

Patent Document 1: International Publication Pamphlet No. 2013/076829
Patent Document 2: International Publication Pamphlet No. 2018/221453

SUMMARY

Problem to be Solved by the Invention

Recently, studies on an automatic maneuvering system have been promoted not only in the field of automobiles but also in ships, and a self-position estimation with good accuracy is equally important for safe automatic ship maneuvering. In an open sea, there are few structures in the surroundings, and it is possible to measure the self-positions by GNSS (Global Navigation Satellite System). However, in urban coasts and rivers, since high-rise buildings or the like are adjoined to each other, the reception condition of GNSS radio waves is degraded due to lowering of the number of receiving satellites and multipath, and positioning with good accuracy is often impossible. Therefore, even in a case of a ship, highly accurate position estimation by the above scan matching is preferably applied.

However, in a case of the ship, there is a problem that effects of tidal currents and waves cause errors in estimated positions, which in turn reduces the accuracy of the self-position estimation.

The present disclosure has been made to solve the problems as described above, and a main object thereof is to provide an information processing device capable of improving accuracy of the self-position estimation on the ship.

Means for Solving the Problem

The invention described in claim is an information processing device including: a predicted position acquisition means configured to acquire a predicted position of a ship: an estimated position calculation means configured to calculate estimated position of the ship in which the predicted position is updated, based on a matching between data based on an output of an external sensor provided on the ship and map data; a reliability calculation means configured to calculate a reliability of the matching; and a velocity calculation means configured to calculate a velocity of the ship at a first process time based on the estimated position at the first process time, an estimated position at a second process time immediately before the first process time, and a time constant set depending on at least the reliability.

Moreover, the invention described in claim is an information processing method performed by a computer, including: acquiring a predicted position of a ship: calculating estimated position of the ship in which the predicted position is updated, based on a matching between data based on an output of an external sensor provided on the ship and map data; calculating a reliability of the matching; and calculating a velocity of the ship at a first process time based on the estimated position at the first process time, an estimated position at a second process time immediately before the first process time, and a time constant set depending on at least the reliability.

Furthermore, the invention described in claim is a program causing a computer to execute processing of: acquiring a predicted position of a ship; calculating an estimated position of the ship in which the predicted position is updated, based on a matching between data based on an output of an external sensor provided on the ship and map data; calculating a reliability of the matching; and calculating a velocity of the ship at a first process time based on the estimated position at the first process time, an estimated position at a second process time immediately before the first process time, and a time constant set depending on at least the reliability.

BRIEF DESCRIPTION OF THE DRAWINGS

FIG. 1A is a diagram illustrating a schematical configuration of a driving assistance system according to a first embodiment.

FIG. 5 is a diagram for explaining an example of a process performed by the self-position estimation unit.

FIG. 12A illustrates an example in a case of performing the self-position estimation of a ship without the filter.

MODES TO EXECUTE THE INVENTION

Figure 1B:
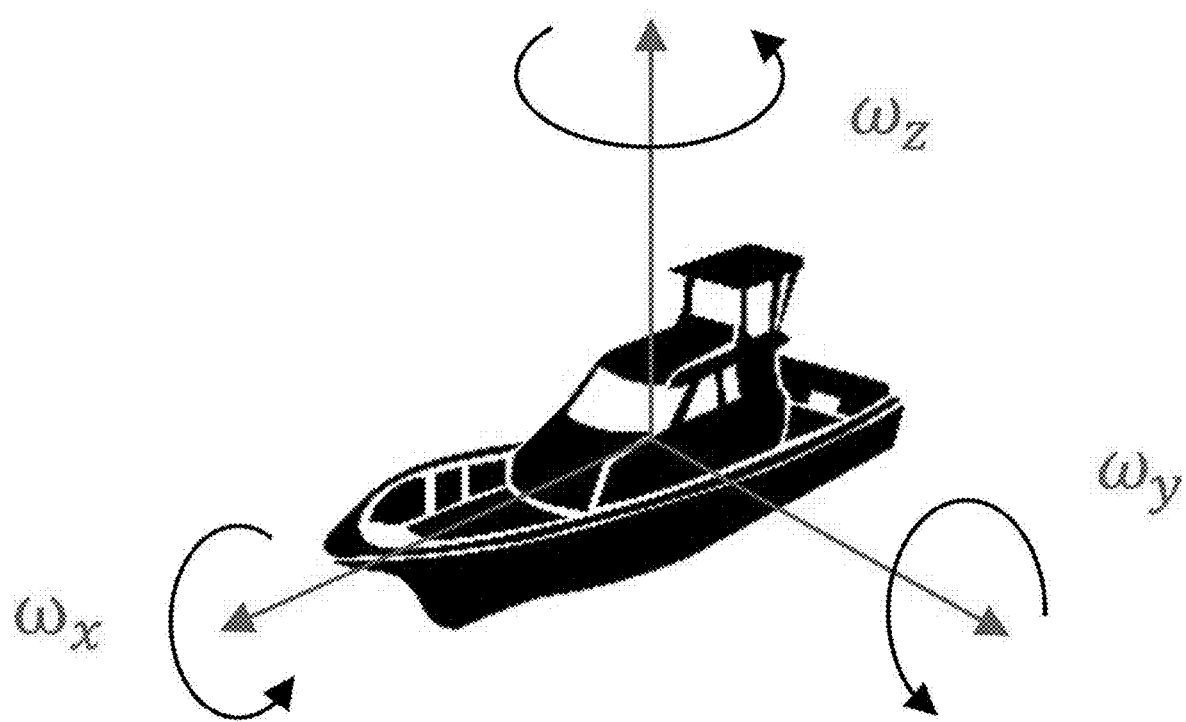
FIG. 1B is a diagram for explaining angular velocities used for a self-position estimation.

According to one preferable aspect of the present invention, there is provided an information processing device comprising: a predicted position acquisition means configured to acquire a predicted position of a ship; an estimated position calculation means configured to calculate estimated position of the ship in which the predicted position is updated, based on a matching between data based on an output of an external sensor provided on the ship and map data; a reliability calculation means configured to calculate a reliability of the matching; and a velocity calculation means configured to calculate a velocity of the ship at a first process time based on the estimated position at the first process time, an estimated position at a second process time immediately before the first process time, and a time constant set depending on at least the reliability.

The information processing device described above includes the predicted position acquisition means, the estimated position calculation means, the reliability calculation means, and the velocity calculation means. The predicted position acquisition means acquires the predicted position of the ship. The estimated position acquisition means calculates the estimated position of the ship which is updated, based on matching of data based on outputs of an external sensor provided on the ship. The reliability calculation means calculates the reliability of the matching. The velocity calculation means calculates a velocity of the ship at the first process time based on the estimated position at the first process time, an estimated position at a second process time immediately before the first process time, and a time constant set depending on at least the reliability. Accordingly, it is possible improve an accuracy of a self-position estimation for the ship.

In one mode of the information processing device described above, the time constant is set to be smaller depending on a magnitude of the reliability.

In another mode of the information processing device described above, the time constant is set based on the reliability and an acceleration of the ship.

In still another mode of the information processing device described above, the predicted position acquisition means acquires the predicted position at the first process time based on the estimated position at the second process time and the velocity or the ship at the second process time.

In a further mode of the information processing device described above, the reliability calculation means calculates the reliability based on at least a score value indicating a degree of matching.

In a still further mode of the information processing device described above, the data correspond to second point cloud data which are point cloud data for which a down-sampling is performed with respect to first point cloud data which are point cloud data output by the external sensor, and the reliability calculation means calculates the reliability based on at least a size of the down-sampling or a number of measurement points of the first point cloud data.

In a yet still further mode of the information processing device described above, the reliability calculation means calculates the reliability based on at least a ratio in which the data are associated with the map data.

According to another aspect of the present invention, an information processing method performed by a computer, comprising: acquiring a predicted position of a ship; calculating the estimated position of the ship in which the predicted position is updated, based on a matching between data based on an output of an external sensor provided on the ship and map data; calculating a reliability of the matching; and calculating a velocity of the ship at a first process time based on the estimated position at the first process time, an estimated position at a second process time immediately before the first process time, and a time constant set depending on at least the reliability. Accordingly, it is possible improve an accuracy of the self-position estimation for the ship.

According to a further aspect of the present invention, a program causing a computer to execute processing of: acquiring a predicted position of a ship; calculating an estimated position of the ship in which the predicted position is updated, based on a matching between data based on an output of an external sensor provided on the ship and map data; calculating a reliability of the matching; and calculating a velocity of the ship at a first process time based on the estimated position at the first process time, an estimated position at a second process time immediately before the first process time, and a time constant set depending on at least the reliability. By executing this program on a computer, the above information processing device can be realized.

EMBODIMENTS

Preferred embodiments of the present invention will be described with reference to the accompanying drawings. Note that a letter with "•", "^", or "-" above any symbol are referred to herein as "A'", "A^" or "A⁻" (where "A" is any letter).

First Embodiment

First, a first embodiment will be described.
[Overview of Driving Assistance System]
FIG. 1A is a diagram illustrating a schematic configuration of a driving assistance system according to a first embodiment. The driving assistance system according to the present embodiment includes an information processing device 1 which moves with a ship being a moving object, and a sensor group 2 mounted on the ship. Hereafter, the ship which moves together with the information processing device 1 is also referred to as a "target ship".

The information processing device 1 is electrically connected to the sensor group 2 and estimates a position (also referred to as a "self-position") of the target ship in which the information processing device 1 is provided based on outputs of various sensors included in the sensor group 2. Then, the information processing device 1 performs a driving assistance such as automatic driving control of the target ship based on an estimation result of the self-positions. The driving assistance includes a berthing assistance such as an automatic berthing. Here, "berthing" includes not only a case of berthing the target ship to a wharf but also a case of berthing the target ship to a structural body such as a pier. The information processing device 1 may be a navigation device provided into the target ship or an electronic control device built in the ship.

Moreover, the information processing device 1 stores a map database (DB: DataBase) 10 including voxel data "VD". The voxel data VD are data which record position information of stationary structures or the like in each voxel representing a cube (regular lattice), which is the smallest unit of a three-dimensional space. The voxel data VD include the data representing the measured point cloud data of the stationary structures in the voxels by the normal distribution, and as will be described later, the voxel data are used for scan matching using an NDT (Normal Distributions Transform). The information processing device 1 performs, for instance, estimation of a position on a plane, a height position, a yaw angle, a pitch angle, and a roll angle of the target ship by an NDT scan matching. Unless otherwise indicated, the self-positions include the attitude angle such as the yaw angle of the target ship.

FIG. 1B is a diagram for explaining an angular velocity used for a self-position estimation. The sensor group 2 includes various external sensors and internal sensors provided on the target ship. In the present embodiment, the sensor group 2 includes a Lidar (Lidar: Light Detection and Ranging, or Laser Illuminated Detection And Ranging) 3, a GPS (Global Positioning System) receiver 5, and an IMU (Inertial Measurement Unit) 6 which measures angular velocities of the target ship in three axial directions. Specifically, as depicted in FIG. 1B, the IMU 6 measures an angular velocity $\omega_x$ of a traveling direction of the target ship, an angular velocity $\omega_y$ of a horizontal direction (lateral direction) of the target ship, and an angular velocity $\omega_z$ of a vertical direction of the target ship.

By emitting a pulse laser with respect to a predetermined angular range in the horizontal direction and the vertical direction, the Lidar 3 discretely measures a distance to an object existing in an outside world and generates three-dimensional point cloud data indicating a position of the object. In this case, the lidar 3 includes an irradiation unit for irradiating a laser beam while changing an irradiation direction, a light receiving unit for receiving reflected light (scattered light) of the irradiated laser beam, and an output unit for outputting scan data (corresponding to points which forms the point cloud data. Hereinafter referred to as "measurement points") based on a light receiving signal output by the light receiving unit. The measurement points are generated based on the irradiation direction corresponding to the laser beam received by the light receiving unit and a response delay time of the laser beam identified based on the light receiving signal. In general, the closer the distance to the object is, the higher the accuracy of the distance measurement value of the Lidar is, and the farther the distance is, the lower the accuracy is. Incidentally, the Lidar 3 is not limited to the scan type Lidar described above and may be a flash type Lidar for generating three-dimensional data by diffusing and irradiating the laser beam to a field of view of a two-dimensional array of sensors.

Note that the sensor group 2 may have a receiver which generates a positioning result of a GNSS other than a GPS, instead of the GPS receiver 5.

[Configuration of Information Processing Device]

Figure 2:
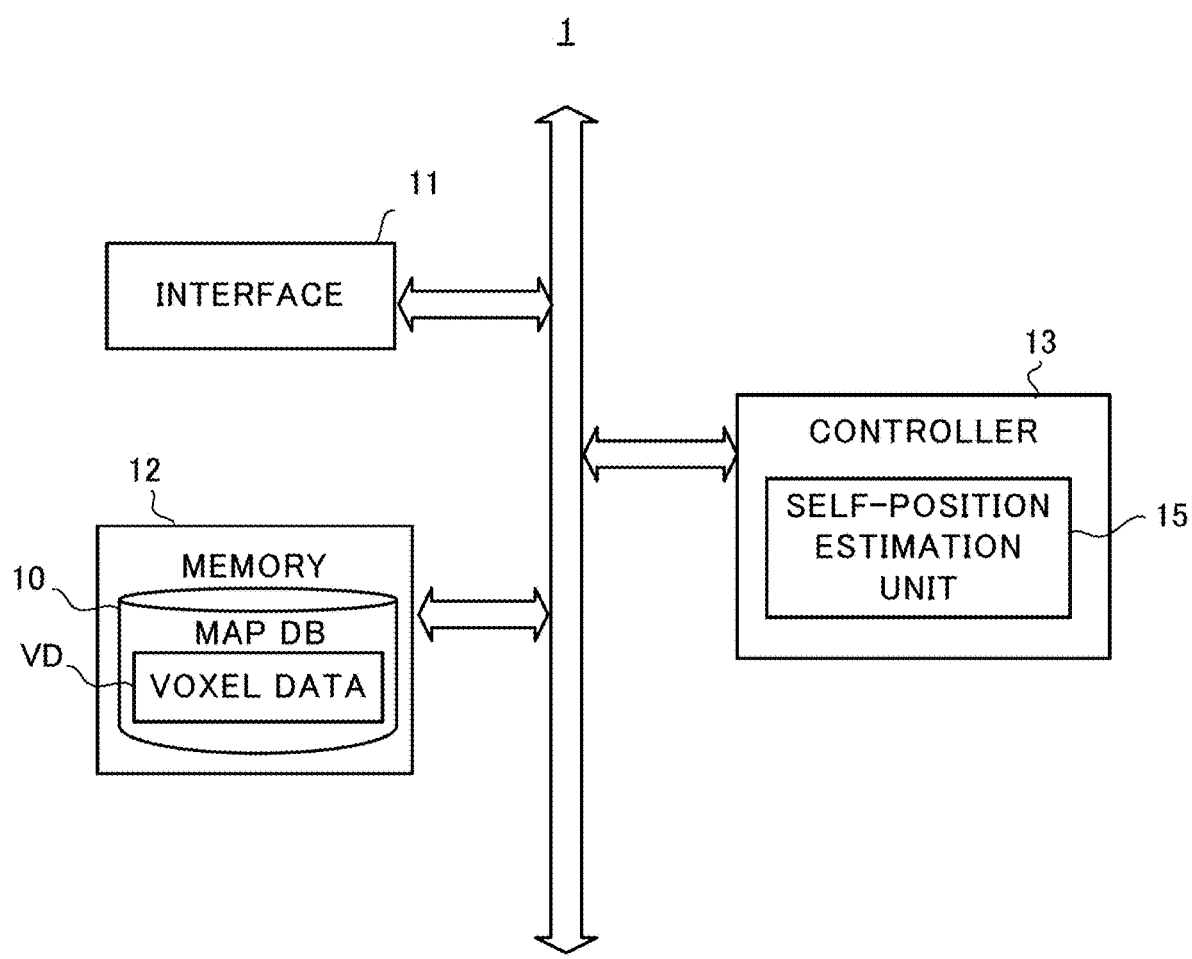
FIG. 2 is a block diagram illustrating an example of a hardware configuration of an information processing device according to the first embodiment.

FIG. 2 is a block diagram illustrating an example of a hardware configuration of an information processing device according to a first embodiment. The information processing device 1 mainly includes an interface 11, a memory 12, and a controller 13. Each of these elements is connected to each other through a bus line.

The interface 11 performs an interface operation related to transfer of data between the information processing device 1 and an external device. In the present embodiment, the interface 11 acquires output data from the sensors of the sensor group 2 such as the Lidar 3, the GPS receiver 5, and the IMU 6, and supplies the output data to the controllers 13. Also, the interface 11 supplies, for instance, signals related to a control of the target ship generated by the controller 13 to each component of the target ship which controls an operation of the target ship. For instance, the target ship includes a driving source such as an engine or an electric motor, a screw which generates a propulsive force in the traveling direction based on the driving force of the driving source, a thruster which generates a lateral propulsive force based on the driving force of the driving source, and a rudder which is a mechanism for freely setting the traveling direction of the ship. During the automatic driving such as the automatic berthing, the interface 11 supplies the control signal generated by the controller 13 to each of these components. Note that in a case where an electronic control device is provided in the target ship, the interface 11 supplies the control signals generated by the controller 13 to the electronic control device. The interface 11 may be a wireless interface such as a network adapter for performing wireless communication, or a hardware interface such as a cable for connecting to the external device. Also, the interface 11 may perform interface operations with various peripheral devices such as an input device, a display device, a sound output device, and the like.

The memory 12 may include various volatile and non-volatile memories such as a RAM (Random Access Memory), a ROM (Read Only Memory), a hard disk drive, a flash memory, and the like. The memory 12 stores a program for the controller 13 to perform a predetermined processing. The program executed by the controller 13 may be stored in a storage medium other than the memory 12.

The memory 12 also stores a map DB 10 including the voxel data VD. The map DB 10 stores, for instance, information concerning berthing locations (including shores and piers) and information concerning waterways in which ships can move, in addition to the voxel-data VD. Note that the map DB 10 may be stored in a storage device external to the information processing device 1, such as a hard disk connected to the information processing device 1 through the interface 11. The above storage device may be a server device which communicates with the information processing device 1. Furthermore, the above storage device may be formed by a plurality of devices. Also, the map DB 10 may be updated periodically. In this case, for instance, the controller 13 receives partial map information concerning an area to which the self-positions belong, from the server device which manages the map information via the interface 11, and reflects the partial map information in the map DB 10.

In addition to the map DB 10, the memory 12 stores information required for the processing performed by the information processing device 1 in the present embodiment. For instance, the memory 12 stores information used for setting a size of down-sampling which is performed on the point cloud data obtained when the Lidar 3 performs scanning for one period.

The controller 13 includes one or more processors such as a CPU (Central Processing Unit), a GPU (Graphics Processing Unit), and a TPU (Tensor Processing Unit, and controls the entire information processing device 1. In this case, the controller 13 performs processing related to the self-position estimation and the driving assistance by executing programs stored in the memory 12.

Furthermore, the controller 13 functionally includes a self-position estimation unit 15. The controller 13 functions as a computer or the like which executes a "prediction position acquisition means", an "estimation position calculation means", a "confidence calculation means", a "velocity calculation means", and the programs.

The self-position estimation unit 15 estimates the self-positions by performing scan matching (NDT scan matching) based on NDT, in accordance with the point cloud data based on the output of the Lidar 3 and the voxel data VD corresponding to the voxel to which the point cloud data belong. Here, the point cloud data to be processed by the self-position estimation unit 15 may be the point cloud data generated by the Lidar 3 or may be the point cloud data obtained by after down-sampling the point cloud data.

[NDT Scan Matching]

Next, the position estimation based on the NDT scan matching executed by the self-position estimation unit 15 will be described.

Figure 3:
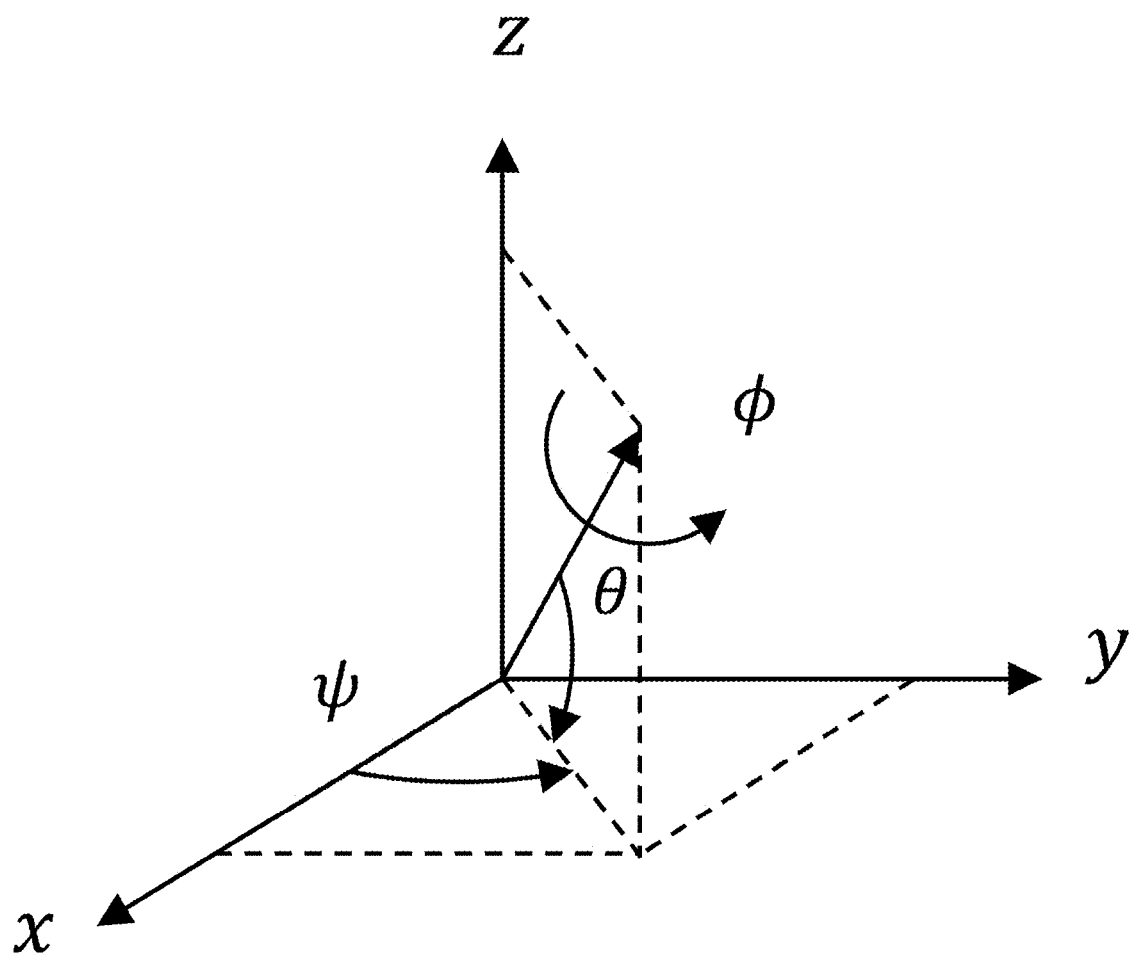
FIG. 3 is a diagram illustrating self-positions to be estimated by a self-position estimation unit.

FIG. 3 is a diagram in which the self-positions to be estimated by the self-position estimation unit 15 is represented by three-dimensional rectangular coordinates. As depicted in FIG. 3, the self-positions in the three-dimensional space defined on the three-dimensional orthogonal coordinates of xyz is represented by coordinates "(x,y,z)", the roll angle "φ", the pitch angle "θ", and a yaw angle (azimuth) "ψ" of the target ship. Here, the roll angle φ is defined as a rotation angle in which the traveling direction of the target ship is taken as an axis, the pitch angle θ is defined as an elevation angle in the traveling direction of the target ship with respect to a xy plane, and a yaw angle ψ is defined as an angle formed by the traveling direction of the target ship and a x-axis. The coordinates (x, y, z) are in the world coordinates indicating an absolute position corresponding to a combination of latitude, longitude, and altitude, or a position expressed by using a predetermined point as an origin, for instance. Then, the self-position estimation unit 15 performs the self-position estimation using these x, y, z, φ, θ, and ψ as estimation parameters.

Next, the voxel data VD used for the NDT scan matching will be described. The voxel data VD includes the data in which the point cloud data of the stationary structures measured in each voxel are expressed by a normal distribution.

Figure 4:
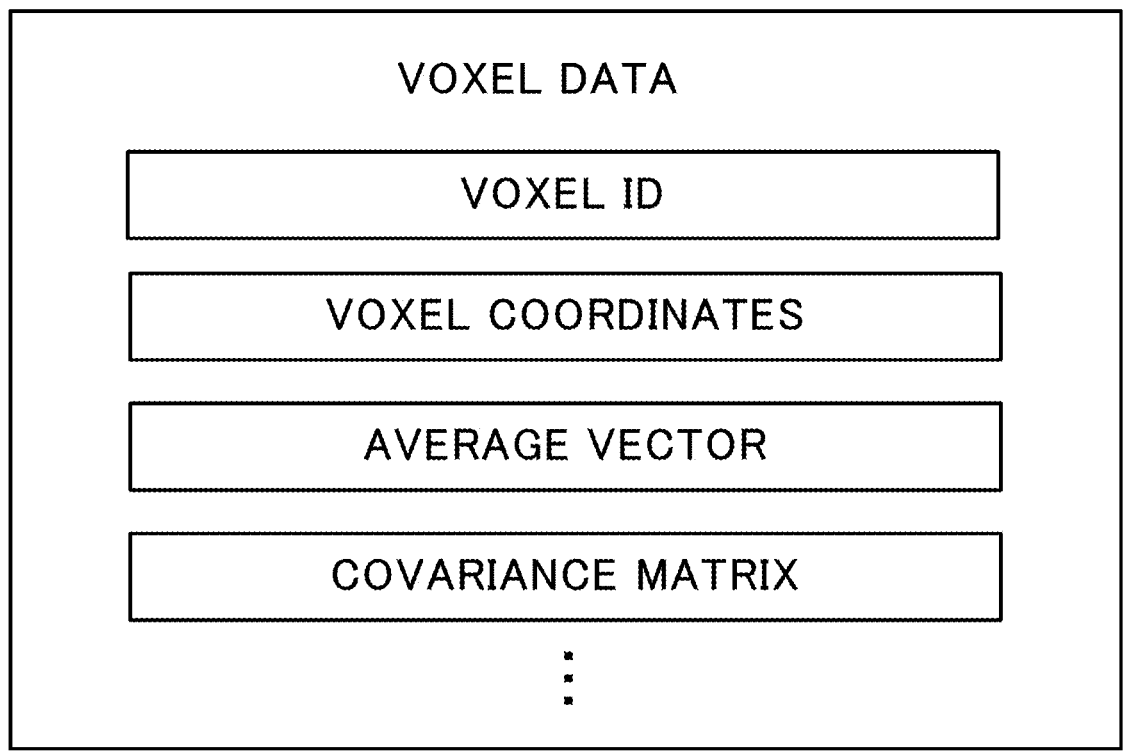
FIG. 4 is a diagram illustrating an example of a schematic data structure of voxel data VD.

FIG. 4 is a diagram illustrating an example of a schematic data structure of the voxel data VD. The voxel data VD include parameter information for expressing point clouds in the voxel in a normal distribution. In the present embodiment, the voxel data VD includes a voxel ID, voxel coordinates, a mean vector, and a covariance matrix, as depicted in FIG. 4.

The "voxel coordinates" indicate the absolute three-dimensional coordinates of the reference position such as the center position of each voxel. Incidentally, since each voxel is a cube obtained by dividing the space into lattice shapes and a shape and size of the voxel are determined in advance, it is possible to identify the space of each voxel by the voxel coordinates. The voxel coordinates may be used as the voxel ID.

The "mean vector" and the "covariance matrix" show a mean vector and a covariance matrix corresponding to parameters when the point cloud within the voxel is expressed by the normal distribution. Assuming that the coordinates of an arbitrary point "i" within an arbitrary voxel "n" is expressed as:

$$X_n(i)=[x_n(i),y_n(i),z_n(i)]^T$$

and the number of the point clouds in a voxel n is defined as "$N_n$", a mean vector "$\mu_n$" and a covariance matrix "$V_n$" in the voxel n are expressed by the following Formulas (1) and (2), respectively.

[Formula 1]
$$\mu_n = \begin{bmatrix} \bar{x}_n \\ \bar{y}_n \\ \bar{z}_n \end{bmatrix} = \frac{1}{N_n} \sum_{i=1}^{N_n} X_n(i) \quad (1)$$

[Formula 2]
$$V_n = \frac{1}{N_n - 1} \sum_{i=1}^{N_n} \{X_n(i) - \mu_n\}\{X_n(i) - \mu_n\}^T \quad (2)$$

Next, an outline of the NDT scan matching using the voxel data VD will be described.

The scan matching by NDT assuming a ship estimates an estimation parameter P having a moving amount and a direction of the ship in the three-dimensional space (here, xyz coordinates are used) as elements:

$$P=[t_x,t_y,t_z,t_\varphi,t_\theta,t_\psi]^T$$

Here, "$t_x$" denotes the moving amount in a x-direction, "$t_y$" is the moving amount in a y-direction, "$t_z$" denotes the moving amount in a z-direction, "$t_\varphi$" denotes the roll angle, "$t_\theta$" denotes the pitch angle, and "$t_\psi$" denotes the yaw angle.

Furthermore, assuming the coordinates of the point cloud data output by the Lidar 3 are expressed as:

$$X_L(j)=[x_n(j),y_n(j),z_n(j)]^T$$

the average value "L'n" of $X_L(j)$ is expressed by the following formula (3). By such operation, the point cloud data is down-sampled.

[Formula 3]
$$L'_x = \begin{bmatrix} L'_x \\ L'_y \\ L'_z \end{bmatrix} = \frac{1}{N} \sum_{j=1}^{N} X_L(j) \quad (3)$$

Then, using the above-described estimation parameter P, the coordinate conversion of the average value L' is performed based on the known coordinate conversion processing. Thereafter, the converted coordinates are defined as "$L_n$".

Next, the self-position estimation unit 15 searches the voxel data VD associated with the point cloud data converted into an absolute coordinate system that is the same coordinate system as the map DB 10 (referred to as a "world coordinate system"), and calculates the evaluation function value "$E_n$" of the voxel n (referred to as the "individual evaluation function value") using a mean vector un and a covariance matrix $V_n$ included in the voxel data VD. In this case, the self-position estimation unit 15 calculates an individual evaluation function value $E_n$ of the voxel n based on the following formula (4).

[Formula 4]
$$E_n = \exp\left\{-\frac{1}{2}(L_n - \mu_n)^T V_n^{-1}(L_n - \mu_n)\right\} \quad (4)$$

Then, the self-position estimation unit 15 calculates an overall evaluation function value (also referred to as a "score value") "E(k)" targeting all voxels to be matched, which is expressed by the following formula (5). A score value E serves as an indicator of fitness of the matching.

[Formula 5]
$$E(k) = \sum_{n=1}^{M} E_n = E_1 + E_2 + \ldots + E_M \quad (5)$$

After that, the self-position estimation unit 15 calculates the estimation parameter P which maximize a score value E(k) by an arbitrary root finding algorithm such as Newton method. Then, the self-position estimation unit 15 calculates the self-positions based on the NDT scan matching (also referred to as an "NDT position") "$X_{NDT}(k)$" by applying the estimated parameter P to a position (also referred to as a "DR position") "$X_{DR}(k)$" calculated by a dead reckoning at a process index number (hereinafter, referred to as a "process number") k. Note that, each of the DR position and the NDT position includes information of a position and a posture. Here, the DR positions $X_{DR}(k)$ corresponds to tentative self-positions prior to the calculation of the estimated self-positions X^(k), and is also referred to as the predicted self-positions "X⁻(k)". In this case, the NDT position $X_{NDT}(k)$ is expressed by the following formula (6).

[Formula 6]
$$X_{NDT}(k) = \overline{X}(k) + P \quad (6)$$

Then, the self-position estimation unit 15 regards the NDT position $X_{NDT}(k)$ as a final estimation result of the self-positions at the process number k (also referred to as "estimated self-positions") "X^(k)".

[Posture Prediction]

The self-position estimation section 15 calculates angular velocities "φ·(k)", "θ·(k)", and "ψ·(k)" at the process number k in the world coordinate system based on the following formulas (7) to (9). In the following each of formulas (7) to (9), "φ^(k−1)", "θ^(k−1)", and "ψ^(k−1)" represents the estimated self-postures at a process number k−1 in the world coordinate system. Furthermore, in the following formulas (7) to (9), each of "$\omega_x(k)$", "$\omega_y(k)$" and the "$\omega_z(k)$" represents the angular velocity at the process number k in a ship coordinate system measured by the IMU 6.

[Formula 7]
$$\dot{\phi}(k) = \quad (7)$$
$$\omega_x(k) + \omega_y(k)\sin\hat{\phi}(k-1)\tan\hat{\theta}(k-1) + \omega_z(k)\cos\hat{\phi}(k-1)\tan\hat{\theta}(k-1)$$

[Formula 8]
$$\dot{\theta}(k) = \omega_y(k)\cos\hat{\phi}(k-1) - \omega_z(k)\sin\hat{\phi}(k-1) \quad (8)$$

[Formula 9]
$$\dot{\psi}(k) = \omega_y(k)\frac{\sin\hat{\phi}(k-1)}{\cos\hat{\theta}(k-1)} + \omega_z(k)\frac{\cos\hat{\phi}(k-1)}{\cos\hat{\theta}(k-1)} \quad (9)$$

Moreover, the self-position estimation unit 15 calculates the predicted self-postures "φ⁻(k)", "θ⁻(k)", and "ψ⁻(k)" at the process number k in the world coordinate system by applying the angular velocities "φ·(k)", "θ·(k)", and "ψ·(k)", and the estimated self-postures "φ^(k−1)", "θ^(k−1)", and "ψ^(k−1)" with respect to the following formulas (10) to (12), respectively. Note that in the following formulas (10) to (12), "Δt(k)" represents a time difference obtained by subtracting the process time "t(k−1)" of the process number k−1 from the process time "t(k)" of the process number k.

[Formula 10]
$$\overline{\phi}(k) = \hat{\phi}(k-1) + \dot{\phi}(k)\Delta t(k) \quad (10)$$

[Formula 11]
$$\overline{\theta}(k) = \hat{\theta}(k-1) + \dot{\theta}(k)\Delta t(k) \quad (11)$$

[Formula 12]
$$\overline{\psi}(k) = \hat{\psi}(k-1) + \dot{\psi}(k)\Delta t(k) \quad (12)$$

That is, a second term on a right side in each of the above formulas (10) to (12) represents a change amount corresponding to a magnitude of a change in a posture which is predicted to have been occurred between the process number k−1 and the process number k.

Then, the self-position estimation unit 15 calculates the estimated self-postures "φ^(k)", "θ^(k)", and "ψ^(k)" at the process number k in the world coordinate system by applying a similar process to the NDT scan matching described above with respect to the predicted self-postures "φ⁻(k)", "θ⁻(k)", and "ω⁻(k)".

[Position Prediction and Velocity Calculation]

The self-position estimation unit 15 calculates the predicted self-positions "x⁻(k)", "y⁻(k)", and "z⁻(k)" at the process number k in the world coordinate system by applying the estimated self-positions "x^(k−1)", "y^(k−1)", and "z^(k−1)" at the process number k−1 in the world coordinate system and velocities "x·(k−1)", "y·(k−1)", and "z·(k−1)" in the world coordinate system at the process number k−1 with respect to the following formulas (13) to (15) described below.

[Formula 13]
$$\overline{x}(k) = \hat{x}(k-1) + \dot{x}(k-1)\Delta t(k) \quad (13)$$

[Formula 14]
$$\overline{y}(k) = \hat{y}(k-1) + \dot{y}(k-1)\Delta t(k) \quad (14)$$

[Formula 15]
$$\overline{z}(k) = \hat{z}(k-1) + \dot{z}(k-1)\Delta t(k) \quad (15)$$

That is, a second term on a right side in each of the formulas (13) to (15) described above represents the change amount corresponding to the magnitude of the change in the position which is predicted to have occurred from the process number k−1 to the process number k.

The self-position estimation unit 15 calculates the estimated self-positions "x^(k)", "y^(k)", and "z^(k)" at the number k in the world coordinate system by applying the similar process to the NDT scan matching described above, with respect to the predicted self-positions "x⁻(k)", "y⁻(k)", and "z⁻(k)".

After that, the self-position estimation unit 15 calculates the velocities "x·(k)", "y·(k)", and "z·(k)" at the process number k in the world coordinate system based on the following formulas (16) to (18). In the following formulas (16) to (18), "τ" represents a time constant, and "s" represents a Laplace operator.

[Formula 16]

$$\dot{x}(k) = \frac{1}{\tau s + 1} \frac{\hat{x}(k) - \hat{x}(k-1)}{\Delta t} \quad (16)$$

[Formula 17]

$$\dot{y}(k) = \frac{1}{\tau s + 1} \frac{\hat{y}(k) - \hat{y}(k-1)}{\Delta t} \quad (17)$$

[Formula 18]

$$\dot{z}(k) = \frac{1}{\tau s + 1} \frac{\hat{z}(k) - \hat{z}(k-1)}{\Delta t} \quad (18)$$

Arithmetic processing using the above formulas (13) to (18), for instance, can be illustrated as in FIG. 5. Note that in FIG. 5, "last estimated positions" represents the estimated self-positions at the process number k−1, the "DR positions" represent the predicted self-positions at the process number k, and an "NDT estimation result" represents the estimated self-position at the process number k. FIG. 5 is a diagram for explaining an example of a process to be performed by the self-position estimation unit.

[Calculation of Time Constant τ]

The self-position estimation unit 15 calculates a reliability value NRV (NDT Reliability Value) based on the following formula (19).

[Formula 19]

$$NRV = DSS \times DAR \times \text{Score} \quad (19)$$

"DSS" in the formula (19) described above represents a size of the down-sampling. The down-sampling performed by the formula (3) is conducted by dividing the space by a grid with an appropriate size and calculating the mean value for each grid. In a case of a large number of point cloud data of the Lidar 3, since it is possible to suppress an amount of data by increasing a grid size, it is possible to terminate an NDT matching process within a predetermined period. Therefore, as the number of point cloud data obtained when Lidar 3 scans for one cycle increases, the "DSS" is increased and the reliability value NRV is increased. In other words, in a case where the "DSS" is a large value, an estimation result of the self-position estimation is more reliable.

A "DAR" in the above formula (19) represents a ratio at which the point cloud data after the down-sampling is associated with a map. Therefore, in the point cloud data obtained when Lidar 3 scans for one cycle, in a case where there is little occlusion and little change in an actual state relative to the map stored in the map DB 10, the "DAR" becomes larger and the reliability value NRV becomes larger. In other words, when the "DAR" is large, the estimation result of the self-position estimation is more reliable.

A "Score" in the above formula (19) denotes a value corresponding to the score value E described above. Therefore, in a case where the estimated result of the self-location estimation is close to an optimal solution, the "Score" is larger and the reliability value NRV is larger. In other words, in a case where the "Score" is large, the estimation result of the self-position estimation is more reliable.

Figure 6:
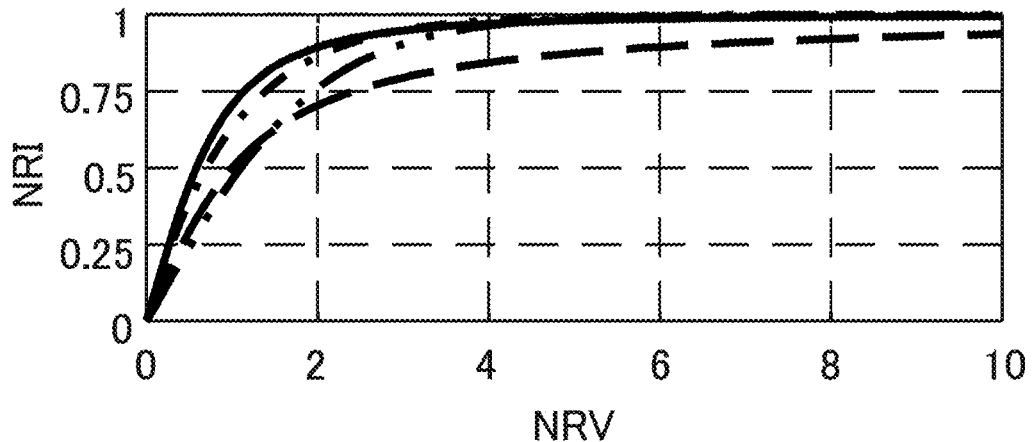
FIG. 6 is a diagram illustrating a relationship between a reliability value NRV and a reliability value NRI.

The self-position estimation unit 15 calculates a reliability index NRI (NDT Reliability Index) obtained by converting the reliability value NRV into a value belonging to 0 or more and 1 or less, by applying the reliability value NRV to any one of the following formulas (20) to (23). Note that a relationship between the reliability value NRV and the reliability index NRI is expressed as depicted in FIG. 6. FIG. 6 is a diagram illustrating the relationship between the reliability value NRV and the reliability index NRI.

[Formula 20]

$$NRI = \frac{NRV}{\sqrt{1 + (NRV)^2}} \quad (20)$$

[Formula 21]

$$NRI = \frac{2}{1 + \exp(-NRV)} - 1 \quad (21)$$

[Formula 22]

$$NRI = \frac{\arctan(NRV)}{\frac{\pi}{2}} \quad (22)$$

[Formula 23]

$$NRI = 1 - \exp(-NRV) \quad (23)$$

Figure 7:
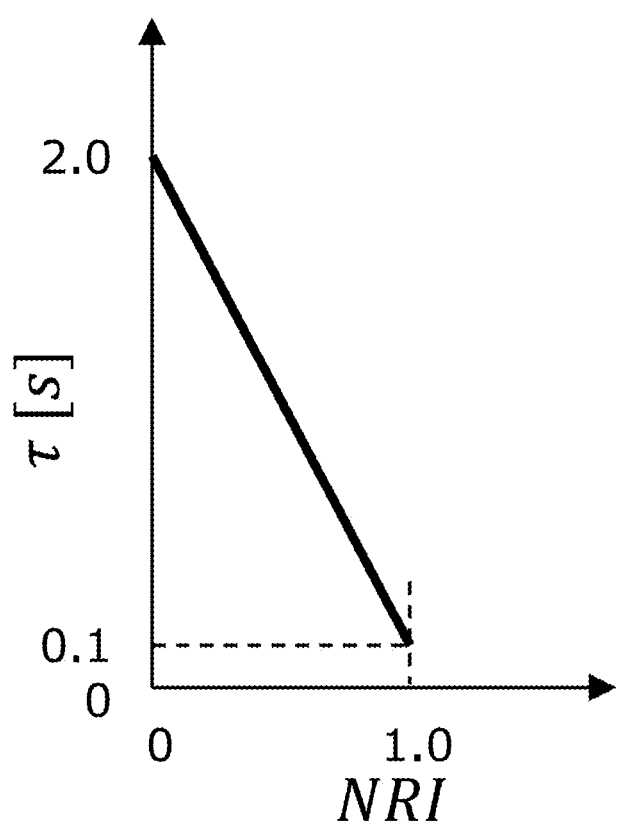
FIG. 7 is a diagram illustrating a relationship between the reliability value NRI and a time constant $\tau$.
Figure 8:
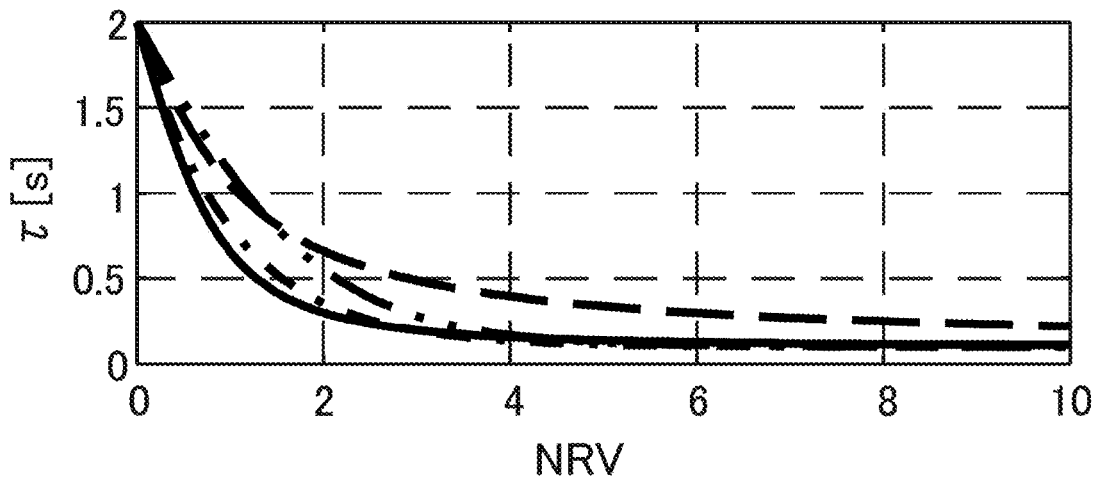
FIG. 8 a diagram illustrating a relationship between the reliability value NRV and the time constant τ.

The self-position estimation unit 15 calculates the time constant t by applying the reliability index NRI to the following formula (24). Note that relationship between the reliability index NRI and the time constant t is represented in FIG. 7. Also, the relationship between the reliability NRV and the time constant τ is represented in FIG. 8. FIG. 7 is a diagram illustrating a relationship between the reliability index NRI and the time constant τ. FIG. 8 is a diagram illustrating the relationship between the reliability NRV and the time constant τ.

[Formula 24]

$$\tau = -1.9 \times NRI + 2.0 \quad (24)$$

Incidentally, the estimated self-position calculated by the self-position estimation unit 15 includes errors of varying degrees. Therefore, the error is included in the difference from the last estimated self-position, and the error is also included in the calculated value of the velocity in the world coordinate system. In other words, the greater the error of the estimated self-position, the greater the error of the calculated value of the velocity in the world coordinate system. In a case where a large error occurs in the calculated value for the velocity, predicted positions calculated by the formulas (13) to (15) described above may be largely deviated and thus may exceed a search area in the NDT scan matching. Therefore, the velocity error needs to be reduced in order to obtain the predicted position with good accuracy as an initial value in the NDT scan matching.

The error in the estimated self-position can be assumed to be random noise like. Therefore, it is considered that the error in the estimated self-position can be removed by a method similar to a method of removing high frequency noise components by a low-pass filter. In this embodiment, for instance, as in the above formulas (16) to (18), high-frequency noise components are suppressed by using a low-pass filter (1/(τs+1)) of the first-order delay system.

However, in a case of using the low-pass filter as described above, there is a possibility that a disadvantage of not being able to follow a fast movement may arise.

Accordingly, in the present embodiment, the time constant t in the low-pass filter described above is changed depending on the reliability of the self-position estimation. Therefore, for instance, in a state where the reliability of self-position estimation is high and the error is considered to be small, it is possible to expand the bandwidth and improve tracking by setting the time constant t of the above low-pass filter to a small value. Also, for instance, in a state where the reliability of the self-position estimation is low and errors are considered high, it is possible to suppress noise as much as possible by setting the time constant t of the above low-pass filter to the large value. Note that in the following, the above low-pass filter is also referred to simply as a filter.

Figure 9A:
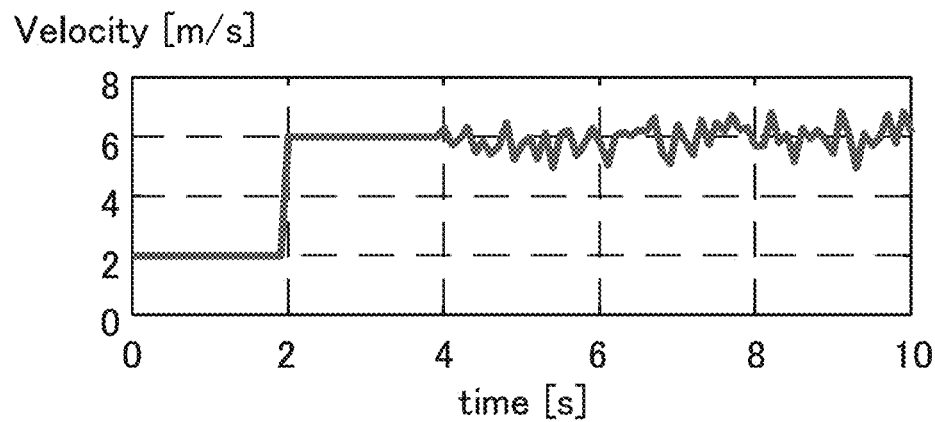
FIG. 9A is a diagram illustrating an example in a case of calculating velocities in a world coordinate system without a filter.
Figure 9B:
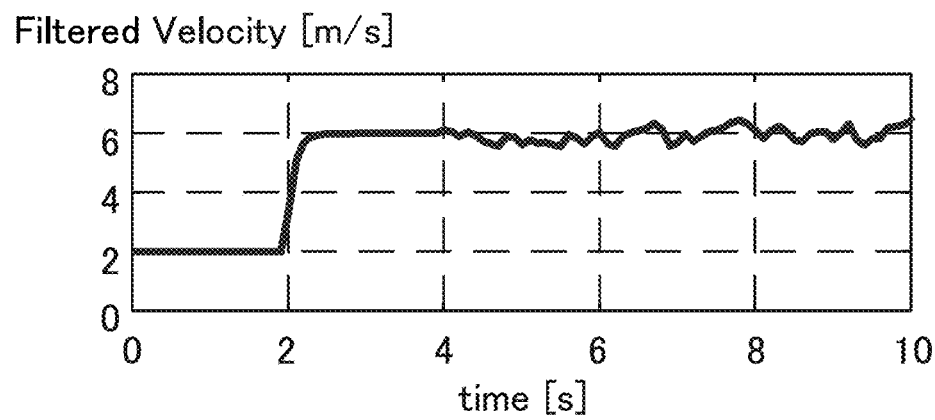
FIG. 9B is a diagram illustrating an example in a case of calculating velocities in the world coordinate system in a state where the time constant t of the filter is fixed.
Figure 10A:
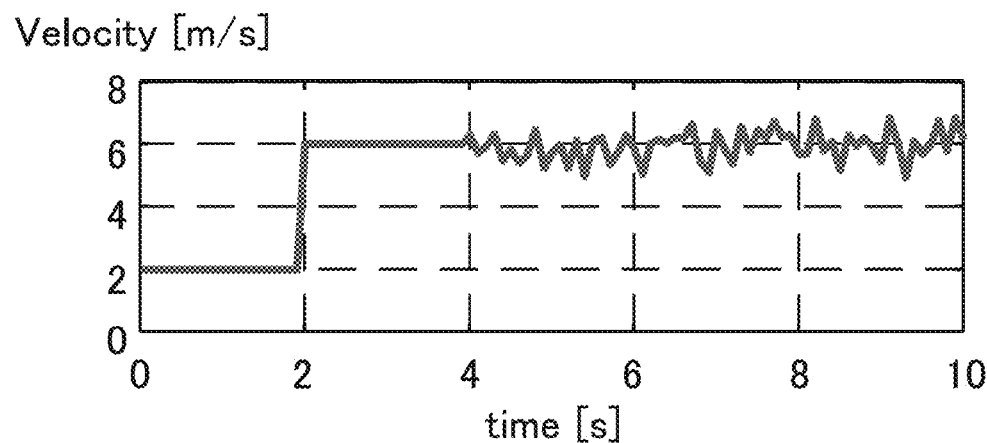
FIG. 10A illustrates an example in a case of calculating velocities in the world coordinate system without the filter.
Figure 10B:
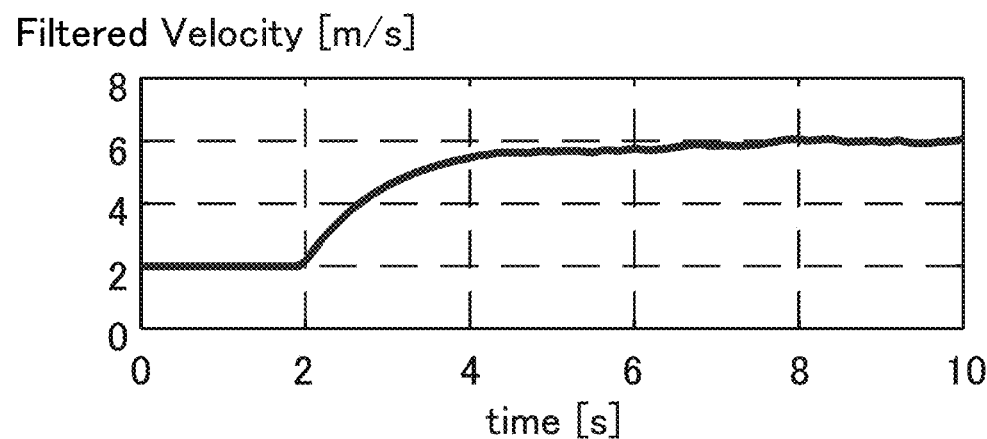
FIG. 10B illustrates an example in a case of calculating velocities in the world coordinate system in a case where the time constant t of the filter is fixed.
Figure 11A:
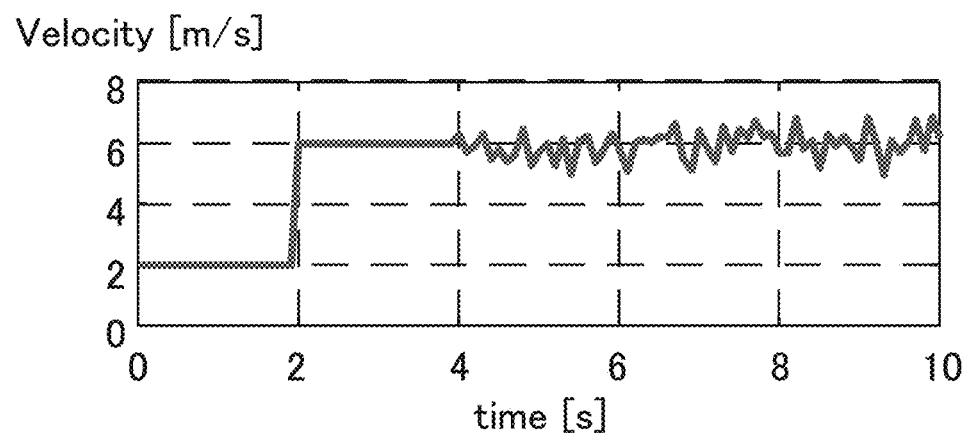
FIG. 11A illustrates an example in a case of calculating velocities in the world coordinate system without the filter.
Figure 11B:
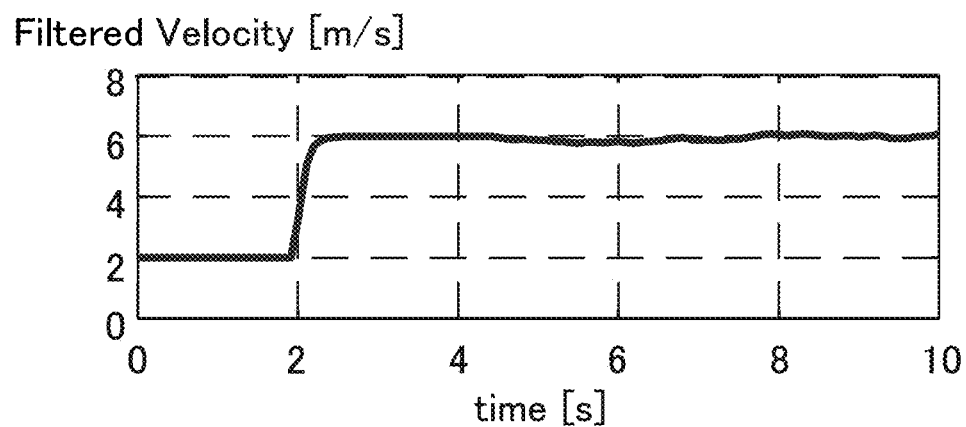
FIG. 11B illustrates an example in a case of calculating velocities in the world coordinate system while changing the time constant t of the filter.

FIG. 9A, FIG. 10A and FIG. 11A are diagrams illustrating examples of calculating the velocity in the world coordinate system without a filter. More specifically, FIGS. 9A, 10A and 11A illustrate states where a sudden change in velocity at 2 seconds from a start of a movement of the ship and noise after 4 seconds from the start of the movement of the ship. FIG. 9B and FIG. 10B are diagrams illustrating examples of calculating the velocity in the world coordinate system while fixing the time constant t of the filter. FIG. 11B is a diagram illustrating an example of calculating the velocity in the world coordinate system while changing the time constant t of the filter.

As illustrated in FIG. 9A and FIG. 9B, in a case where the time constant t of the filter is fixed at 0.1, the filter is able to follow a velocity change, but is not able to suppress the noise. Moreover, as illustrated in FIGS. 10A and 10B, in a case where the time constant t of the filter is fixed to 1.0, the filter is able to suppress noise, but is not able to follow the velocity change. Next, in the present embodiment, as illustrated in FIG. 11A and FIG. 11B, for instance, the time constant τ of the filter is maintained at 0.1 until just before 4 seconds have elapsed after the start of the velocity calculation, and the time constant τ of the filter is changed from 0.1 to 1.0 at a timing where 4 seconds have elapsed, so that the filter can follow the velocity change and suppress the noise.

Note that in a case of implementing the filter of the present embodiment as a program, a conversion is performed in a procedure of a continuous time transfer function (s domain)→a discrete time transfer function (z domain)→a difference equation (time domain).

[Effect of Filter]

Here, effects exhibited by the filter of the present embodiment. Note that for simplicity, the following explanation assumes that the target ship is moving on a two-dimensional plane and that a direction of the target ship is the same as that of the world coordinate system. In the following description, a "true position" means an actual position of the target ship, an "estimated position" means the estimated self-position of the target ship, and the "predicted position" means the predicted self-position of the target ship.

First, when the error of the position becomes large, a problem caused by performing the self-position estimation without using the filter will be described in reference to FIG. 12A. FIG. 12A is a diagram for explaining an example in which the self-position estimation of the ship is performed in a state without the filter.

At the timings of the process numbers k−3 and k−2 in the diagram 12A, with a good self-position estimation, the true position and the estimated position are approximately consistent.

After that, for instance, in a case where circumstances unfavorable for the implementation of the NDT scan matching arise such as a sparse space around the target ship and a passage of a large ship near the target ship at the timing of the process number k−1 in FIG. 12A, the estimated position shifted in the y direction relative to the true position is calculated. Therefore, the velocity at the process number k−1 calculated using a difference between the estimated position at the process number k−2 and the estimated position at the process number k−1 includes an incorrect velocity y·(k−1) in the y direction.

Next, at the timing of the process number k in the FIG. 12A, due to the calculation of the predicted position y⁻(k) using an inappropriate estimated position yˆ(k−1) and the incorrect velocity y·(k−1), the predicted position y⁻(k) is further shifted from the true position. A large deviation of the predicted position y⁻(k) causes an overrun of a search range in the NDT scan matching. As a result, the estimated position yˆ(k) is distanced from the true position. Therefore, due to the fact that y·(k) is calculated as a velocity away from the true position, the estimated position calculated after the state illustrated in FIG. 12A may be further moved away from the true position.

That is, in a case where the self-position estimation is performed without using the filter, the deviation (error) of the predicted position gradually increases due to the occurrence of the unfavorable state for the implementation of the NDT scan matching, so that it is impossible to obtain an appropriate estimated self-position to approach the true position.

Figure 12B:
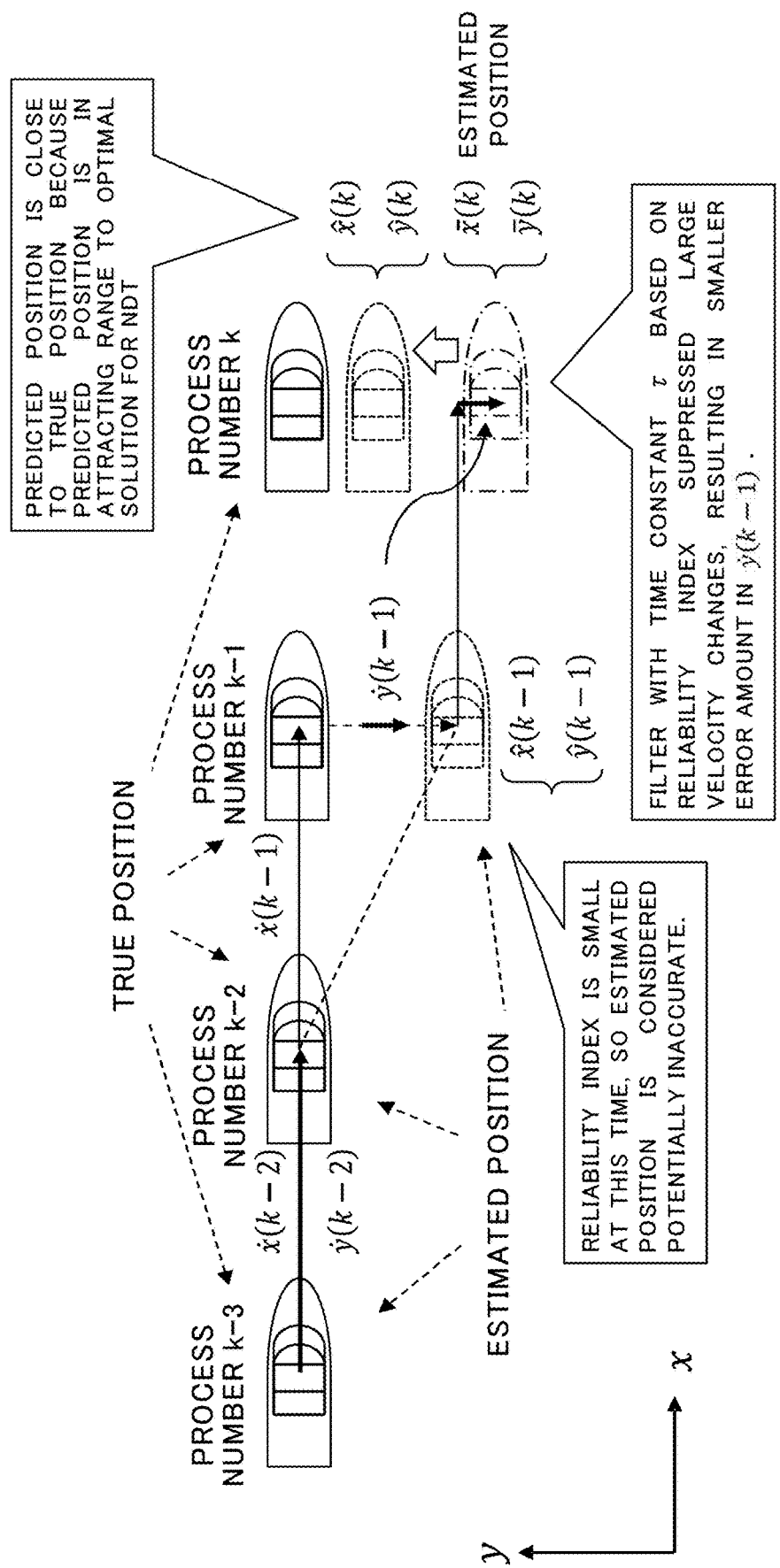
FIG. 12B is a diagram for explaining an example in a case of performing the self-position estimation of the ship with the filter.
Figure 12C:
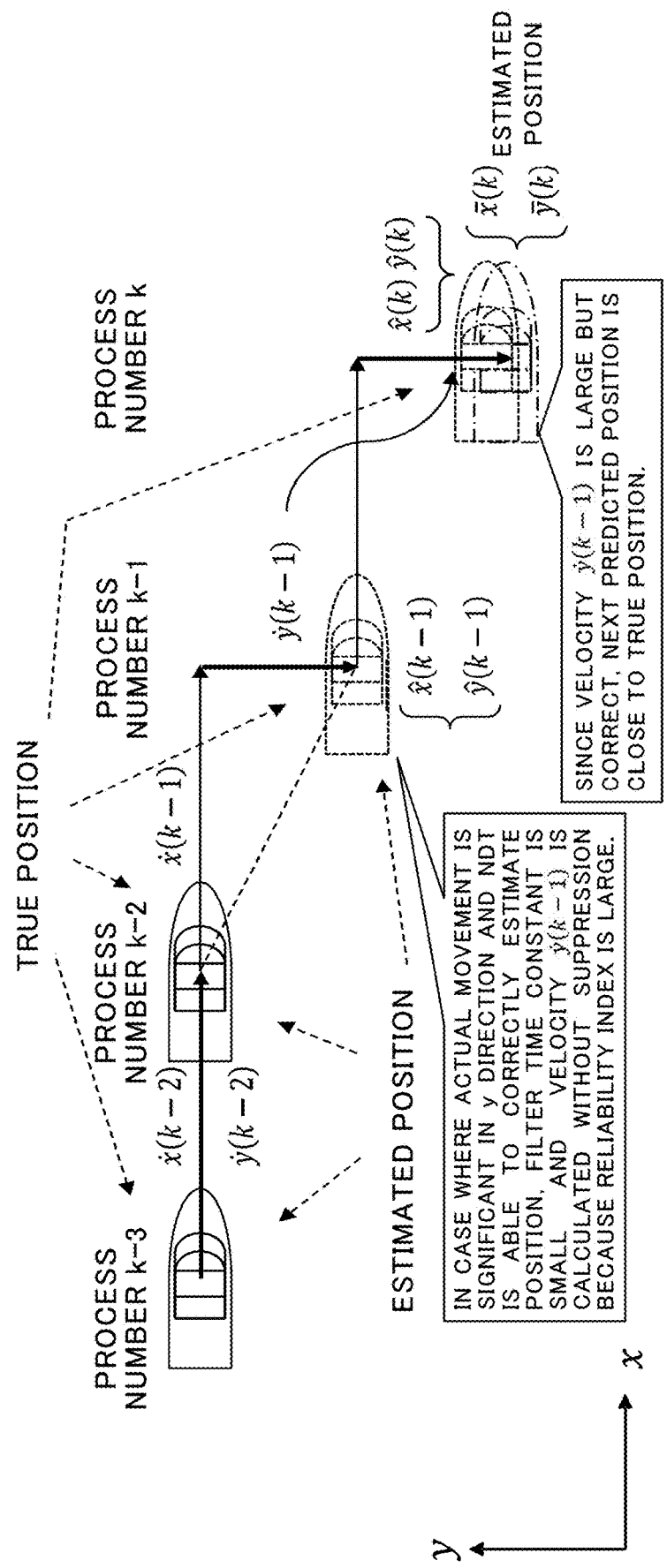
FIG. 12C is a diagram for explaining an example in a case of performing the self-position estimation of the ship with the filter.

Next, an advantage of performing the self-position estimation using the filters of the present embodiment will be described with reference to FIG. 12B. FIG. 12B and FIG. 12C are diagrams for explaining cases in which the self-position estimation of the ship is performed with filters.

At the timing of the process numbers k−3 and k−2 in FIG. 12B, the true position and the estimated position almost coincide with each other because the self-position estimation is performed preferably.

Thereafter, for instance, in a case where the value of the reliability index NRI becomes small due to the unfavorable state in the execution of the NDT scan matching at the timing of the process number k−1 in FIG. 12B, since the estimated position is likely to be inaccurate, the self-position estimation unit 15 sets the time constant τ of the filter used for calculation of the velocity to the large value. As a result, y·(k−1) where a large rate variation is suppressed is calculated.

Next, in the timing of the process number k in the FIG. 12B, since the amount of deviation of the predicted position y⁻(k) is small from the true position, the predicted position y⁻(k) is within the search range in the NDT scan matching, and the estimated position yˆ(k) is able to approach the true position. Also, due to the fact that y·(k) is calculated as the velocity which approaches the true position, the estimated position calculated after the state illustrated in FIG. 12B gradually approaches the true position.

That is, in a case where the self-position estimation is performed using the filter, it is possible to obtain the appropriate estimated self-position which approaches the true position even when an unfavorable state to the implementation of the NDT scan matching occurs.

Incidentally, for a large ship with a large inertia and a small velocity change, there is no problem even in a case where the self-position estimation is performed using the filter with a constant frequency characteristic which does not cause the large velocity change. However, the small ship such as pleasure boats have high acceleration performance, and the amount of velocity change is not necessarily small.

Therefore, for instance, in a case where the reliability of the self-position estimation is sufficiently high, it is considered better to reduce a value of the time constant τ so that the system can respond to a large acceleration/deceleration which may occur in the small ship. Therefore, in this example, by setting the time constant τ in accordance with the reliability index NRI, so that the self-position estimation is performed using the filter capable of adaptively changing the characteristic.

Moreover, for instance, as illustrated in the process number k−1 and the process number k in FIG. 12C, in a case where the target ship has moved significantly in the y direction but the self-position estimation by the NDT scan matching is performed correctly, the value of the reliability index NRI becomes large and the value of the time constant τ of the filter becomes small, so that the velocity y·(k 1) is calculated without being suppressed. As a result, the velocity y·(k 1) is calculated as the large value, while it is calculated as a correct value, so that the predicted position at the process number k is calculated as close to the true position.

[Functional Blocks]

Figure 13:
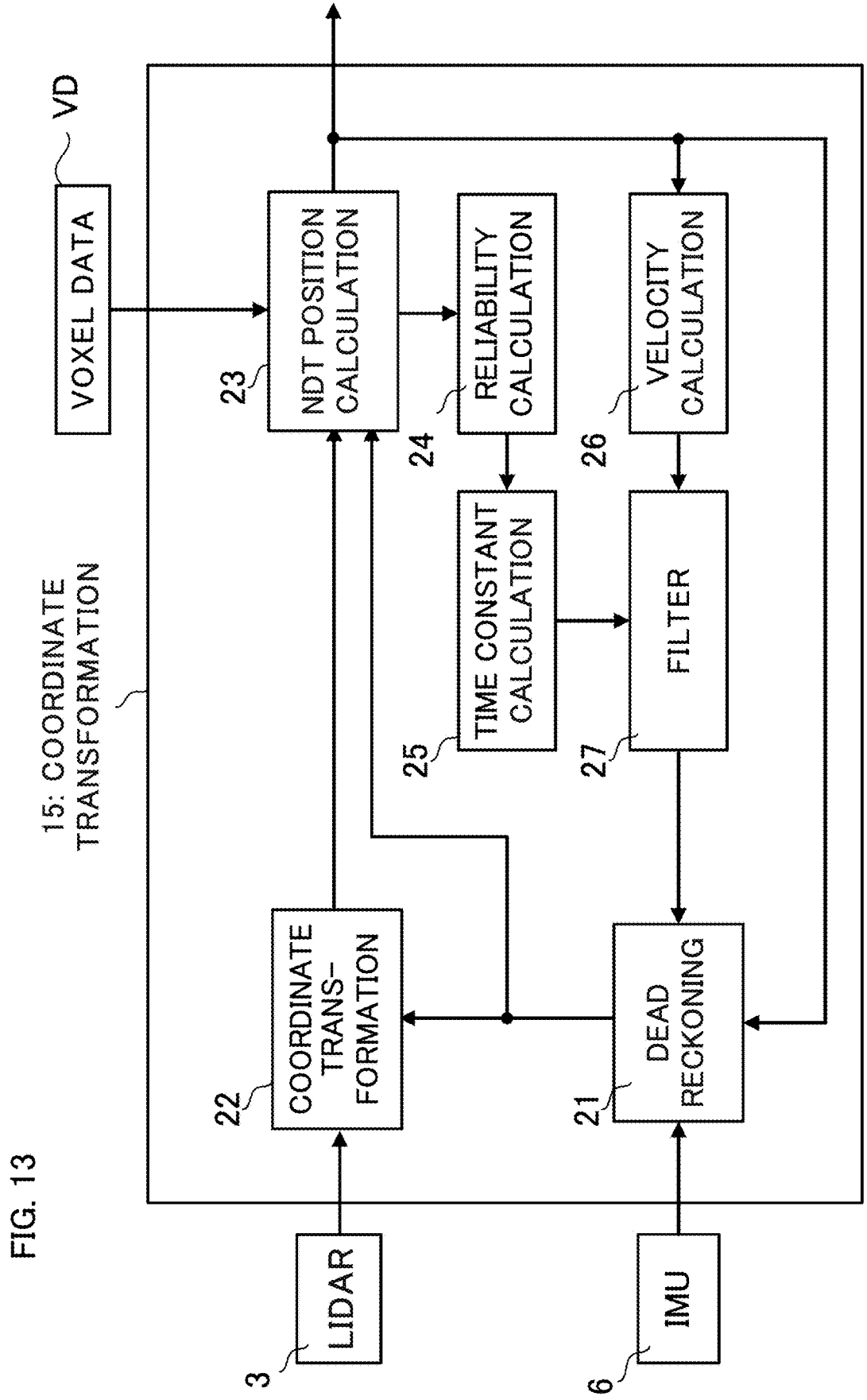
FIG. 13 is a diagram of an example of functional blocks of the self-position estimation unit according to the first embodiment.

FIG. 13 is a diagram illustrating an example of functional blocks of the self-position estimation unit according to the first embodiment. As illustrated in FIG. 13, the self-position estimation unit 15 includes a dead reckoning block 21, a coordinate transformation block 22, an NDT position calculation block 23, a reliability calculation block 24, a time constant calculation block 25, a velocity calculation block 26, and a filter block 27.

The dead reckoning block 21 calculates angular velocities ($\varphi\cdot(k)$, $\theta\cdot(k)$, and $\psi\cdot(k)$) at the timing of the process number k based on angular velocities ($\omega_x(k)$, $\omega_y(k)$ and $\omega_z(k)$) output from the IMU 6 at the timing of the process number k and the estimated self-postures ($\hat{\varphi}(k-1)$, $\hat{\theta}(k-1)$ and $\hat{\psi}(k-1)$) at the process number k−1 immediately before the process number k, which are calculated by the NDT position calculation block 23. Moreover, the dead reckoning block 21 calculates the predicted self-postures ($\varphi^-(k)$, $\theta^-(k)$ and $\psi^-(k)$) at the process number k based on the estimated self-postures at the process number k−1, which are calculated by the NDT position calculation block 23, and the angular velocities at the process number k. The dead reckoning block 21 calculates the predicted self-positions ($x^-(k)$, $y^-(k)$, and $z^-(k)$) at the process number k based on the estimated self-positions ($\hat{x}(k-1)$, $\hat{y}(k-1)$ and $\hat{z}(k-1)$) at the process number k−1 calculated by the NDT position calculation block 23 and the velocities ($x\cdot(k-1)$, $y\cdot(k-1)$, and $z\cdot(k-1)$) at the process number k−1 output from the velocity calculation block 26 via the filter block 27. Note that, immediately after the start of the self-position estimation, in a case where the estimated self-postures and the estimated self-positions in the process number k−1 do not exist, the dead reckoning block 21 calculates, for instance, the predicted self-postures at the process number k based on the angular velocity output from IMU 6, and also calculates the predicted self-position at the process number k based on the signal output from the GPS receiver 5.

The coordinate transformation block 22 transforms the point cloud data based on an output of the Lidar 3 into the world coordinate system which is the same coordinate system as that of the map DB 10. In this case, for instance, the coordinate transformation block 22 performs a coordinate transformation of the point cloud data of the process number k based on the predicted self-postures and the predicted self-positions at the process number k which are obtained as the process result of the dead reckoning block 21. Incidentally, for instance, International Publication WO2019/188745 and the like disclose a process of transforming the point cloud data of the coordinate system with respect to the Lidar installed in the moving object (in this embodiment the ship) to the coordinate system of the moving object, a process of transforming the coordinate system of the moving object into the world coordinate system, and the like.

The NDT position calculation block 23 calculates the estimated self-positions and the estimated self-postures based on the point cloud data obtained as a result of the process of the coordinate transformation block 22. In this instance, the NDT position calculation block 23 matches the point cloud data of the world coordinate system supplied from the coordinate transformation block 22 with the voxel data VD represented by the same world coordinate system, and associates the point cloud data with the voxel. With respect to each of the voxels associated with the point cloud data, the NDT position calculation block 23 calculates the individual evaluation function values based on the formula (4), and calculates the estimated parameter P which maximizes the score value E(k) based on the formula (5). Next, the NDT position calculation block 23 calculates the estimated self-positions ($\hat{x}(k)$, $\hat{y}(k)$, $\hat{z}(k)$) at the process number k by applying the estimated parameter P determined by the process number k to the predicted self-positions at the process number k obtained as the process result of the dead reckoning block 21 based on the formula (6). Also, the NDT position calculation block 23 calculates the estimated self-postures ($\hat{\varphi}(k)$, $\hat{\theta}(k)$, and $\hat{\psi}(k)$) at the process number k by performing the same process as that of the above-described process. Note that the NDT position calculation block 23 may calculate the estimated self-positions and the estimated self-postures after removing data of a water surface position and data lower than the water surface position as erroneous data, for instance, among the point cloud data obtained as the process result of the coordinate transformation block 22.

The reliability calculation block 24 specifies three parameters of the DSS, the DAR and the Score based on the content of the process performed in NDT position calculation block 23. Next, the reliability calculation block 24 calculates the reliability value NRV using the three parameters described above, and transforms the calculated reliability value NRV into the reliability index NRI.

The time constant calculation block 25 calculates the time constant τ using the reliability index NRI obtained as the process result of the reliability calculation block 24.

The velocity calculation block 26 calculates the velocity at the process number k in an unfiltered state by dividing a difference between the estimated self-positions at the process number k obtained as the process result of the NDT position calculation block 23 and the estimated self-positions at the process number k−1 by a time difference Δt(k).

The filter block 27 sets the filter ($1/(\tau s+1)$) using the time constant τ obtained as the process result of the time constant calculation block 25, and calculates the velocities ($x\cdot(k)$, $y\cdot(k)$, $z\cdot(k)$) at the process number k by applying the set filter ($1/(\tau s+1)$) to the velocity calculated by the velocity calculation block 26.

[Process Flow]

Figure 14:
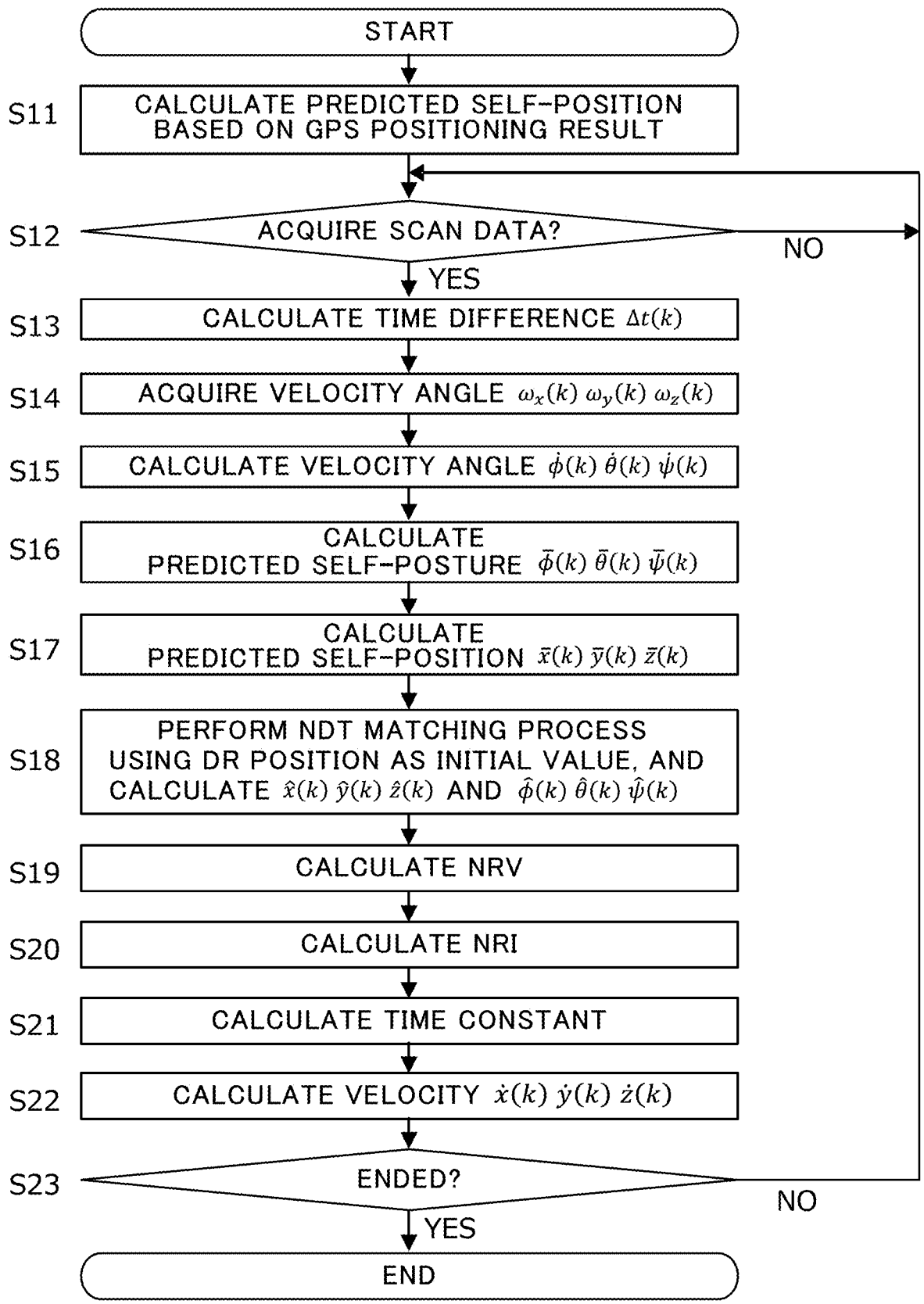
FIG. 14 illustrates a flowchart for explaining an example of a procedure of a self-position estimation process.

FIG. 14 is a flowchart illustrating an example of a procedure of the self-position estimation process to be executed by the self-position estimation unit 15 of the information processing device 1. The self-position estimation unit 15 starts the process of the flowchart in FIG. 8 in a case where a need for the self-position estimation arises such as a case where the power is turned on.

First, immediately after the self-position estimation process starts, the self-position estimation unit 15 calculates the predicted self-positions from a GPS positioning result based on data which the GPS receiver 5 outputs (step S11).

Next, the self-position estimation unit 15 determines whether or not an amount of data possible for performing the NDT scan matching is obtained as scan data from the Lidar 3 (step S12).

When the amount of data possible for performing the NDT scan matching has not been obtained (step S12: NO), the self-position estimation unit 15 acquires the scan data from the Lidar 3 again, and performs the process of step S12 again based on the acquired data. Moreover, when the amount of data possible for executing the NDT scan matching is obtained (step S12: YES), the self-position estimation unit 15 calculates the time difference $\Delta(k)$ (step S13), and further acquires the angular velocity ($\omega_x(k)$, $\omega_y(k)$, $\omega_z(k)$) from the IMU 6 in the ship coordinate system (step S14).

After that, the self-position estimation unit 15 calculates the angular velocities ($\varphi\cdot(k)$, $\theta\cdot(k)$, and $\psi\cdot(k)$) in the world coordinate system based on the angular velocities in the ship coordinate system acquired by step S14 and the formulas (7) to (9) (step S15).

Subsequently, the self-position estimation unit 15 calculates the predicted self-postures ($\varphi^-(k)$, $\theta^-(k)$, and $\psi^-(k)$) in the world coordinate system based on the time difference $\Delta t(k)$ calculated in step S13, the angular velocities in the world coordinate system calculated in step S15, and the formulas (10) to (12) (step S16).

Subsequently, the self-position estimation unit 15 calculates the predicted self positions ($x^-(k)$, $y^-(k)$, and $z^-(k)$) in the world coordinate system based on the time difference $\Delta t(k)$ calculated in step S13 and the formulas (13) to (15) (step S17).

Subsequently, the self-position estimation unit 15 calculates the estimated self-positions ($x^\wedge(k)$, $y^\wedge(k)$, and $z^\wedge(k)$) and the estimated self-postures ($\varphi^\wedge(k)$, $\theta^\wedge(k)$, and $\psi^\wedge(k)$), respectively, by performing the NDT scan matching with the DR positions corresponding to the predicted self-postures acquired in step S16 and the predicted self-positions acquired in step S17 as the initial value (step S18).

Subsequently, the self-position estimation unit 15 calculates the reliability value NRV based on three parameters for DSS, DAR and Score specified based on process details of step S18 and the formula (19) (step S19).

Subsequently, the self-position estimation unit 15 converts the reliability value NRV calculated in step S19 into the reliability index NRI by applying the reliability value NRV to any one of the formulas (20) to (23) (step S20).

Subsequently, the self-position estimation unit 15 calculates the time constant $\tau$ based on the reliability index NRI obtained in step S20 and the formula (24) (step S21).

Subsequently, the self-position estimation unit 15 calculates the velocities ($x\cdot(k)$, $y\cdot(k)$, and $z\cdot(k)$) based on the time difference $\Delta t(k)$ calculated in step S13 and the formulas (16) to (18) where the time constant $\tau$ calculated in step S21 is applied to the filter ($1/(\tau s+1)$) (step S22).

After performing step S22, the self-position estimation unit 15 determines whether or not to terminate the self-position estimation process (step S23). When it is determined that the self-position estimation process ends (step S23: YES), the self-position estimation unit 15 terminates the process of the flowchart. On the other hand, when the self-position estimation process is continued (step S23: NO), the self-position estimation unit 15 goes back to step S12, and calculates the estimated self-positions, the estimated self-postures, the velocities, and the like for a next process number.

[Consideration Based on Experimental Results]

Experimental results on embodiments described above will be discussed.

Figure 15:
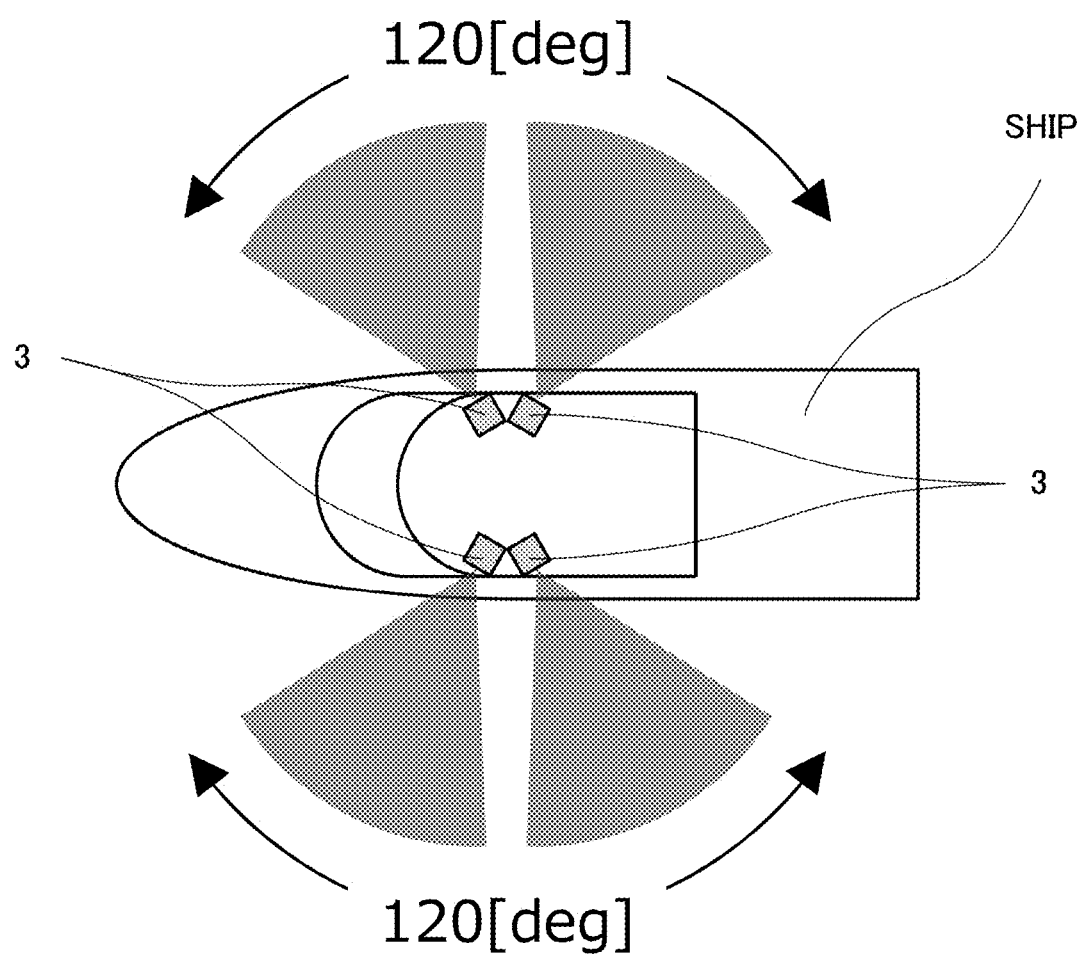
FIG. 15 is a diagram illustrating a scan range of a Lidar at a time of an experiment.

FIG. 15 is a diagram illustrating an installation state and a scan range of the Lidar at a time of an experiment. The applicant performed the NDT position estimation by matching the voxel data for coastal use (ND map), which was created in advance for a certain waterway, with the point cloud data obtained by the Lidar installed on a ship in operation. As illustrated in FIG. 15, this embodiment was conducted with a medium distance and 60 degree horizontal Lidar in a state in which two Lidars with an operating frequency of 12 Hz (period of 83.3 ms) are provided on each side of the ship. For an accuracy evaluation, positioning results of RTK-GPS were used as correct position data.

Note that in this experiment, the down-sampling is carried out for the point cloud data obtained by the Lidar. In this case, the down-sampling size is adaptively changed at every process time so that the number of measurement points associated with the voxel data VD (also referred to as a "number of associated measurement points") among the point cloud data after the down-sampling becomes a predetermined target range in the NDT scan matching. For instance, at each process time, the self-position estimation unit 15 increases the down-sampling size at the next process time by a predetermined rate (that is, 1.1 times) or a predetermined value when the number of associated measurement points is greater than an upper limit of the target range, and decreases the down-sampling size at the next process time by a predetermined velocity or a predetermined value when the number of associated measurement points is less than a lower limit of the target range. On the other hand, when the associated number of measurement points is within the target range at each process time, the self-position estimation unit 15 maintains the down-sampling size. In this adaptive setting of the down-sampling size, the larger the number of associated measurement points, the larger the down-sampling size, and thus it is inferred that the larger the down-sampling size, the more reliable the NDT process.

Figure 16A:
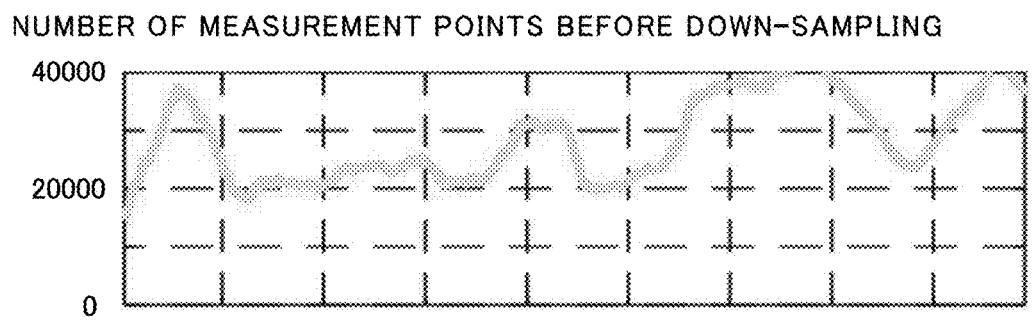
FIG. 16A is a diagram illustrating a self-position estimation result concerning a comparison example in which velocities are calculated without the filter.
Figure 16B:
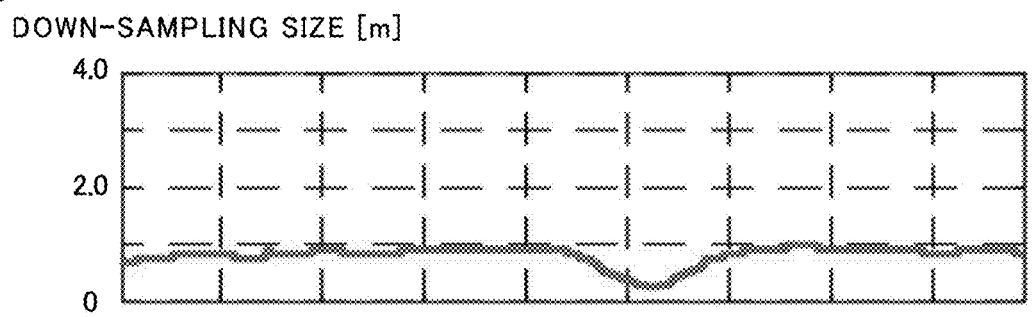
FIG. 16B is a diagram illustrating the self-position estimation result concerning the comparison example in which the velocities are calculated without the filter.
Figure 16C:
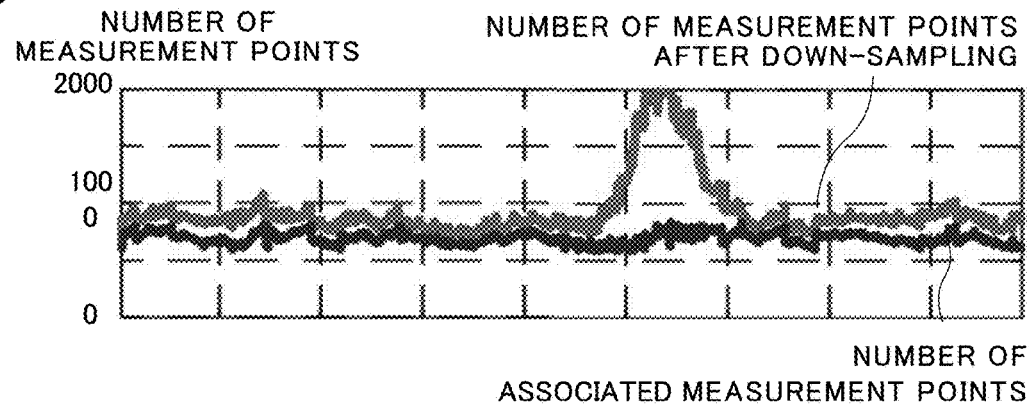
FIG. 16C is a diagram illustrating the self-position estimation result concerning the comparison example in which the velocities are calculated without the filter.
Figure 16D:
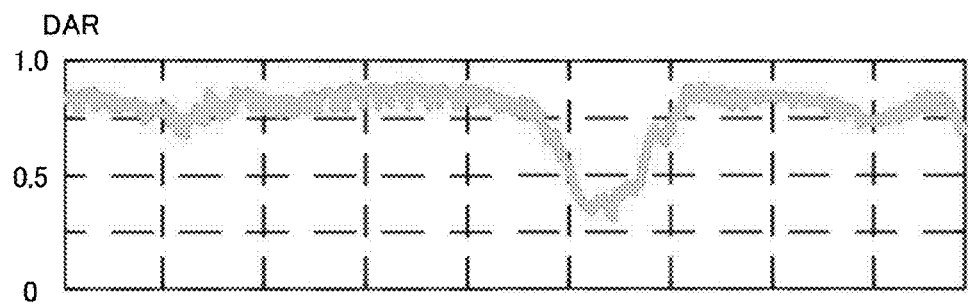
FIG. 16D is a diagram illustrating the self-position estimation result concerning the comparison example in which the velocities are calculated without the filter.
Figure 16E:
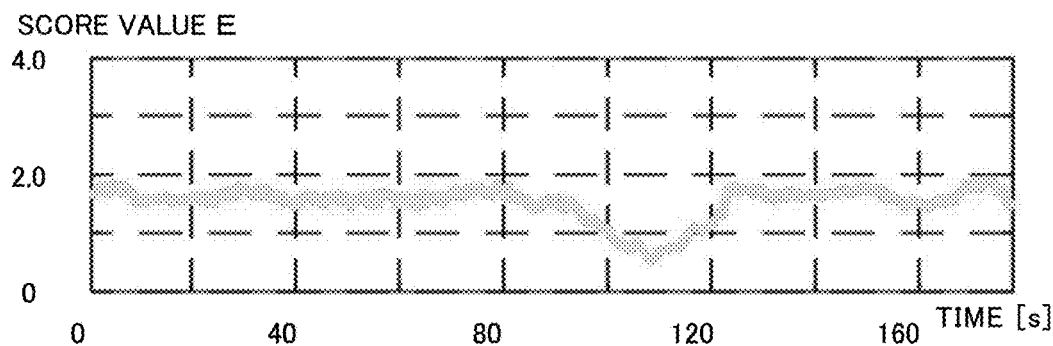
FIG. 16E is a diagram illustrating the self-position estimation result concerning the comparison example in which the velocities are calculated without the filter.
Figure 16F:
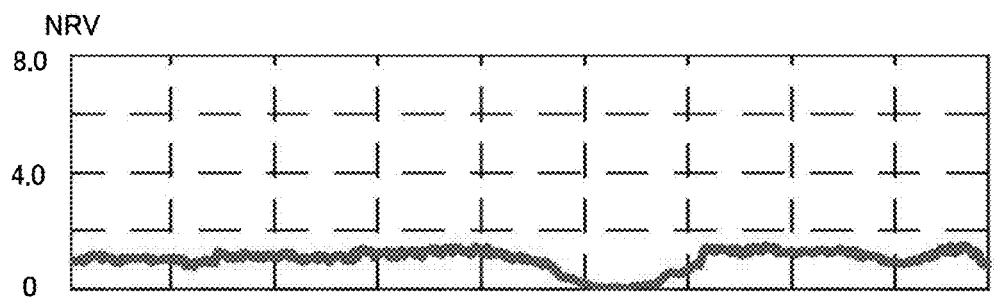
FIG. 16F is a diagram illustrating the self-position estimation result concerning the comparison example in which the velocities are calculated without the filter. 5
Figure 16G:
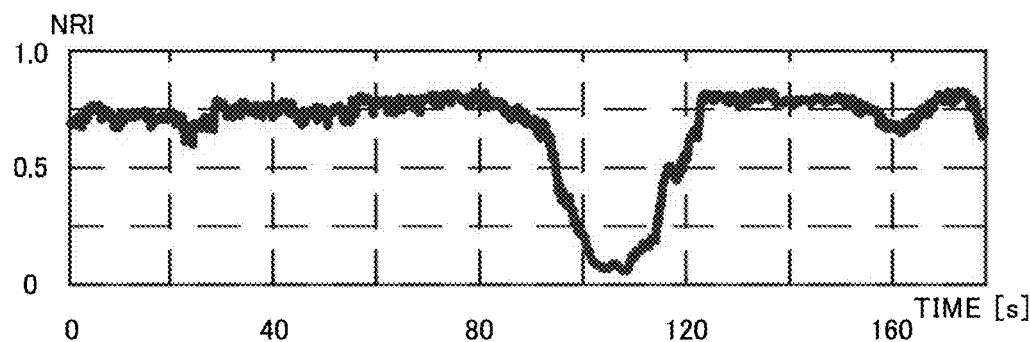
FIG. 16G is a diagram illustrating the self-position estimation result concerning the comparison example in which the velocities are calculated without the filter.
Figure 17A:
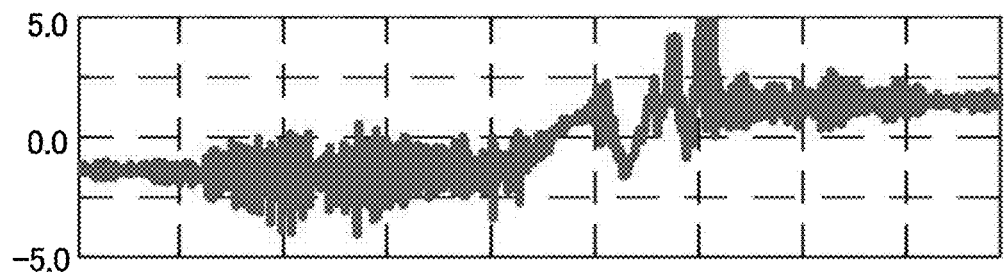
FIG. 17A is a diagram illustrating the self-position estimation result concerning the comparison example in which the velocities are calculated without the filter.
Figure 17B:
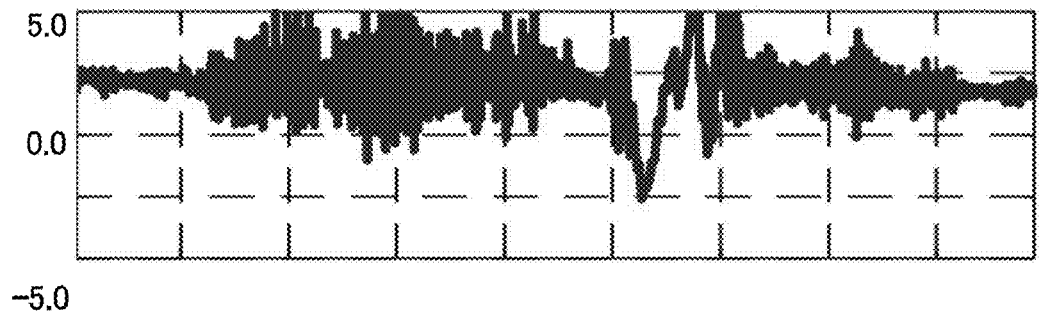
FIG. 17B is a diagram illustrating the self-position estimation result concerning the comparison example in which the velocities are calculated without the filter.
Figure 17C:
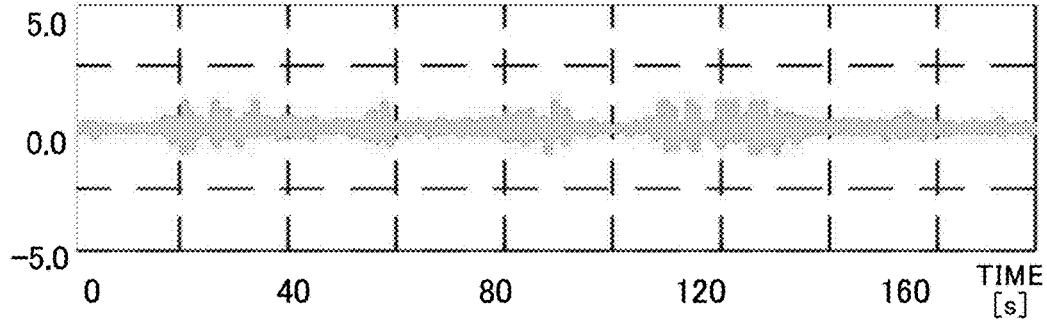
FIG. 17C is a diagram illustrating the self-position estimation result concerning the comparison example in which the velocities are calculated without the filter.
Figure 17D:
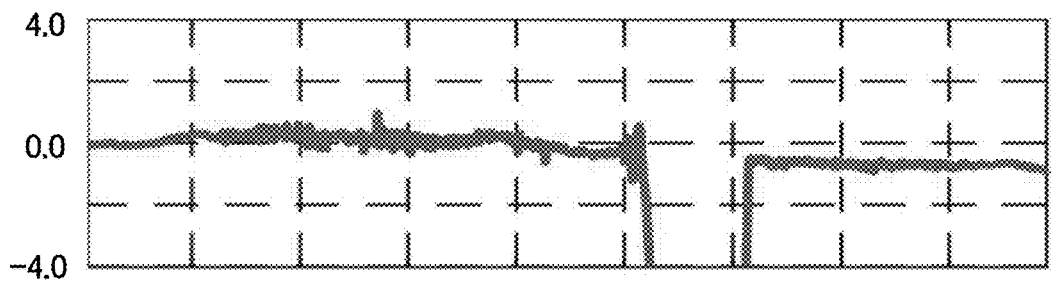
FIG. 17D is a diagram-illustrating the self-position estimation result concerning the comparison example in which the velocities are calculated without the filter. 20
Figure 17E:
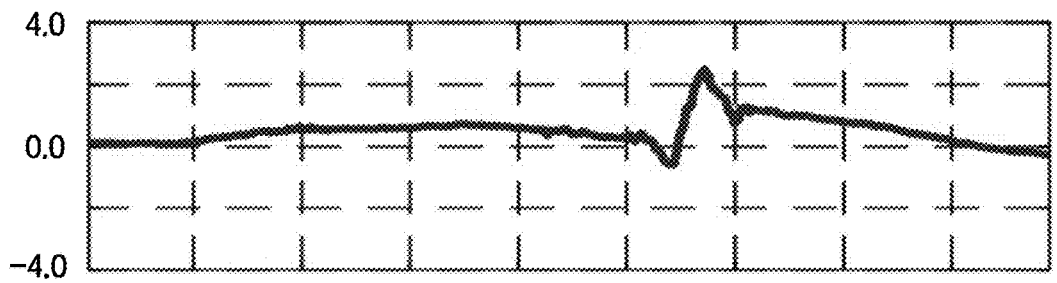
FIG. 17E is a diagram illustrating the self-position estimation result concerning the comparison example in which the velocities are calculated without the filter.
Figure 17F:
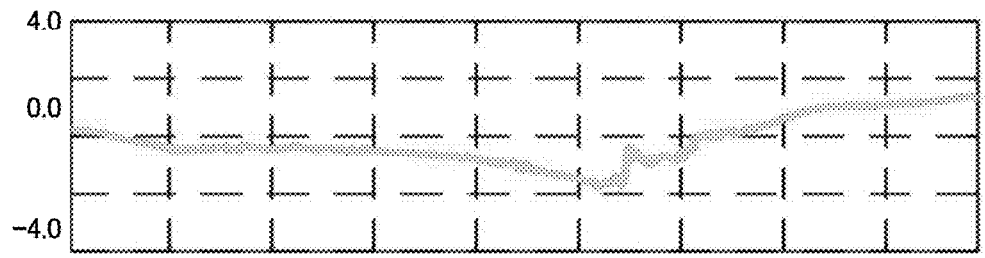
FIG. 17F is a diagram illustrating the self-position estimation result concerning the comparison example in which the velocities are calculated without the filter.
Figure 17G:
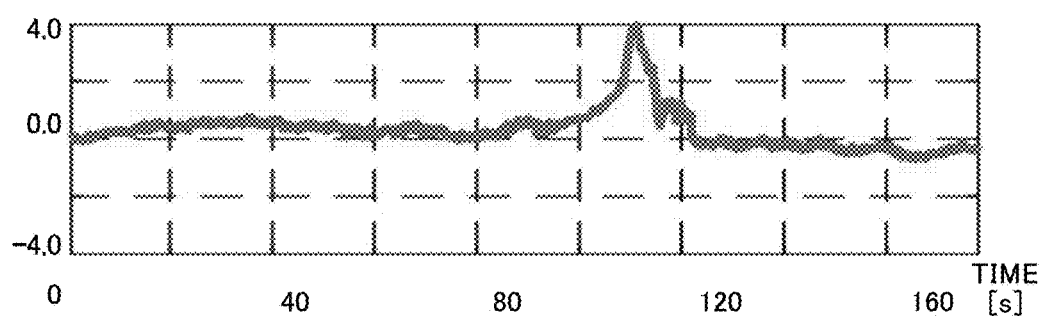
FIG. 17G is a diagram illustrating the self-position estimation result concerning the comparison example in which the velocities are calculated without the filter.

FIG. 16A to FIG. 16G and FIG. 17A to FIG. 17G are diagrams illustrating the self-position estimation results concerning comparative examples in which the velocities are calculated without the filter. Here, FIG. 16A illustrates the number of measurement points of the point cloud data before the down-sampling, FIG. 16B illustrates the size of the down-sampling, FIG. 16C illustrates the number of measurement points and the number of associated measurement points after the down-sampling, FIG. 16D illustrates a data association ratio DAR, FIG. 16E illustrates the score value E, FIG. 16F illustrates the reliability value NRV, and FIG. 16G illustrates the reliability index NRI, respectively. In addition, FIG. 17A illustrates the velocity in the x direction, FIG. 17B illustrates the velocity in the y direction, and FIG. 17C illustrates the velocity in the z direction, respectively. Also, with respect to positioning results of RTK-GPS, FIG. 17D illustrates an error in the traveling direction, FIG. 17E indicates an error in the horizontal direction, FIG. 17F indicates the error in a height direction, and FIG. 17G indicates an error in the yaw angle, respectively.

As illustrated in FIG. 16D, an experimental result concerning the comparative example shows that the value of the data association ratio DAR is decreasing around 90-120 s, and this situation has a negative impact on a calculation accuracy of the NDT scan matching. With an occurrence of this situation, according to the velocities depicted in FIG. 17a to FIG. 17c, there is a disturbance that may be considered an offset especially around 90-120 s. In addition, as depicted in FIG. 17D to FIG. 17G, in a portion where the velocity is disturbed, errors in the estimated self-positions and estimated self-postures are larger than in other portions. In particular, an error in the traveling direction in FIG. 17D which is not depicted in figures for convenience worsened to about −20 m.

Figure 18A:
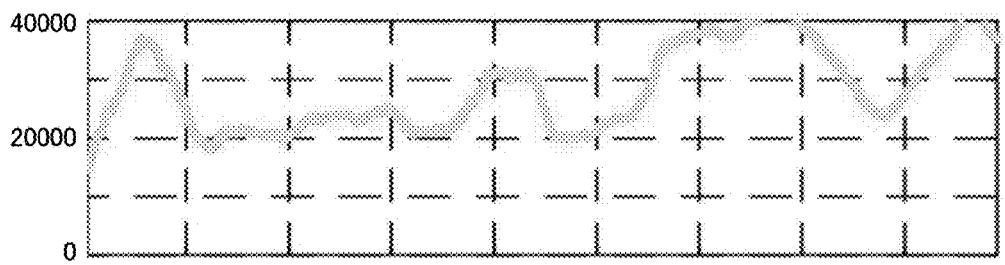
FIG. 18A is a diagram illustrating the self-position estimation result according to the present embodiment in which the velocities are calculated with the filter.
Figure 18B:
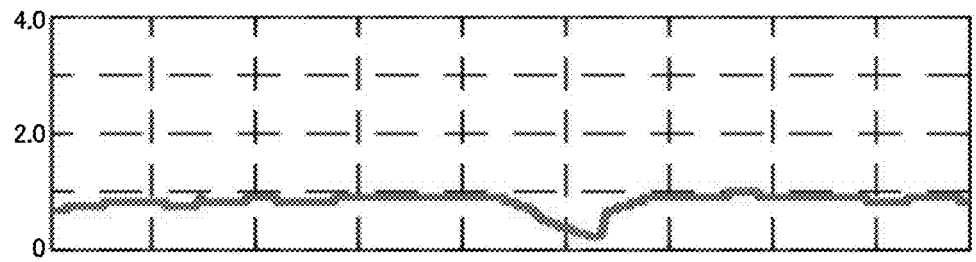
FIG. 18B is a diagram illustrating the self-position estimation result according to the present embodiment in which the velocities are calculated with the filter.
Figure 18C:
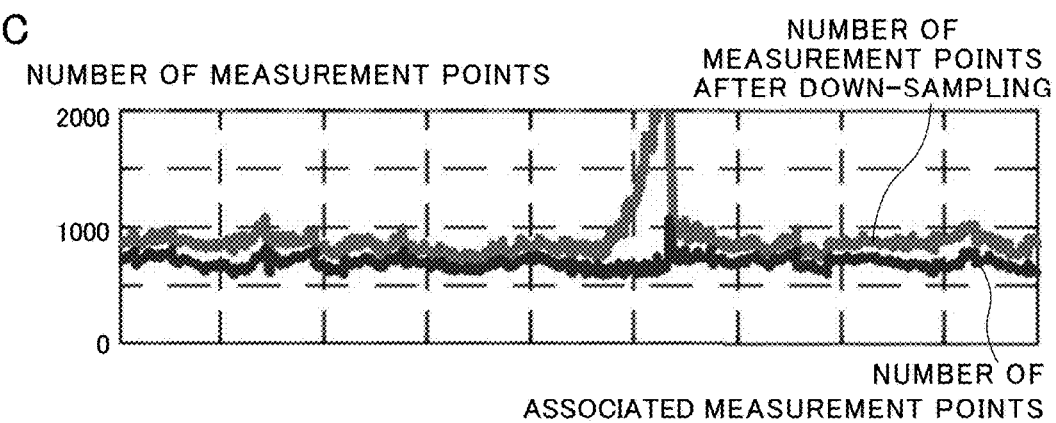
FIG. 18C is a diagram illustrating the self-position estimation result according to the present embodiment in which the velocities are calculated with the filter.
Figure 18D:
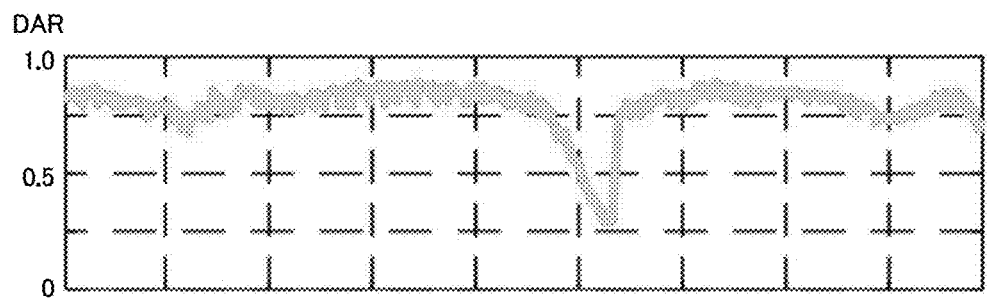
FIG. 18D is a diagram illustrating the self-position estimation result according to the present embodiment in which the velocities are calculated with the filter.
Figure 18E:
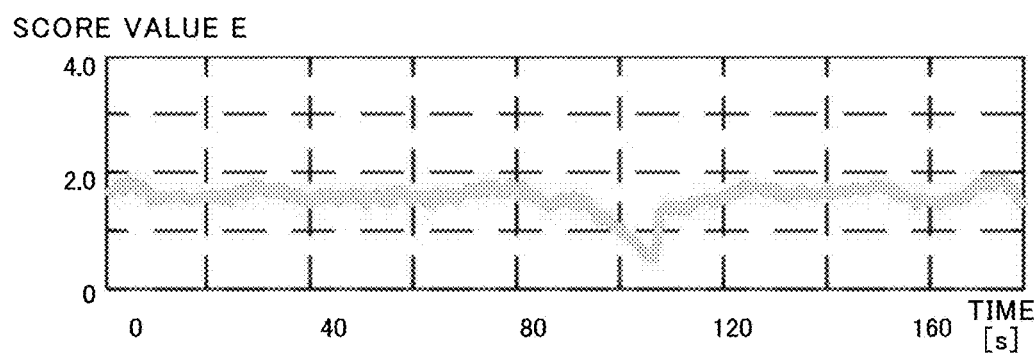
FIG. 18E is a diagram illustrating the self-position estimation result according to the present embodiment in which the velocities are calculated with the filter.
Figure 18F:
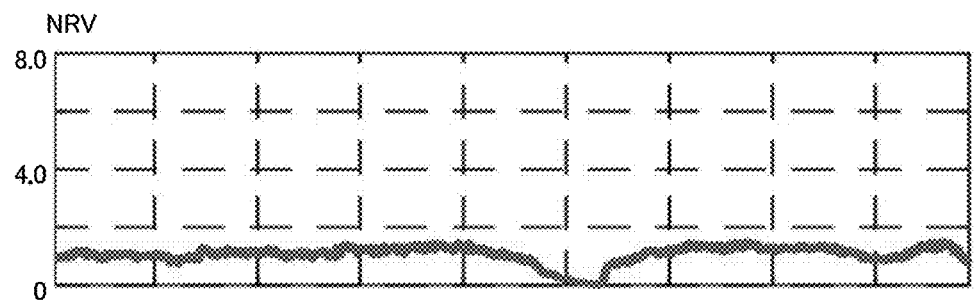
FIG. 18F is a diagram illustrating the self-position estimation result according to the present embodiment in which the velocities are calculated with the filter.
Figure 18G:
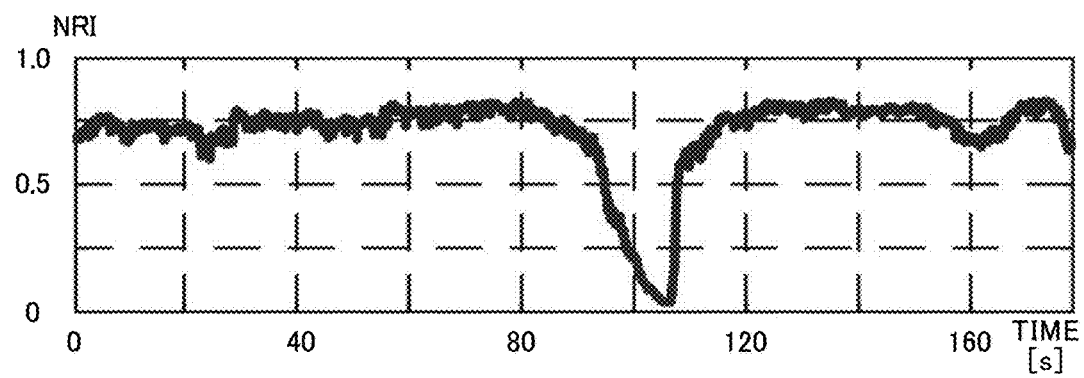
FIG. 18G is a diagram illustrating the self-position estimation result according to the present embodiment in which the velocities are calculated with the filter.
Figure 19A:
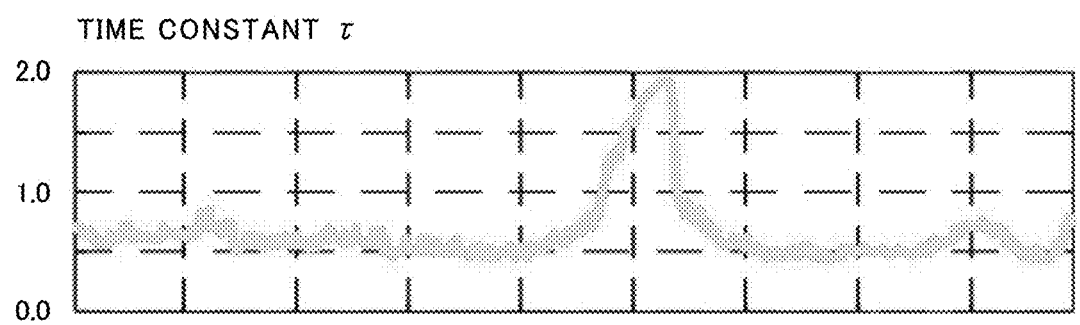
FIG. 19A is a diagram illustrating the self-position estimation result according to the present embodiment in which the velocities are calculated with the filter.
Figure 19B:
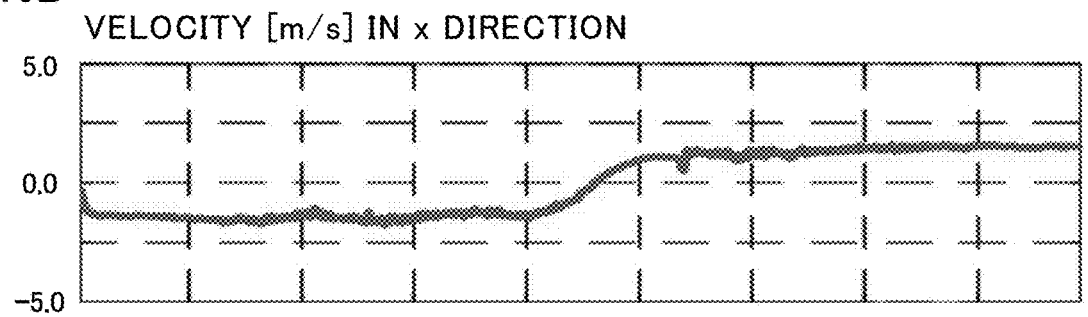
FIG. 19B is a diagram illustrating the self-position estimation result according to the present embodiment in which the velocities are calculated with the filter.
Figure 19C:
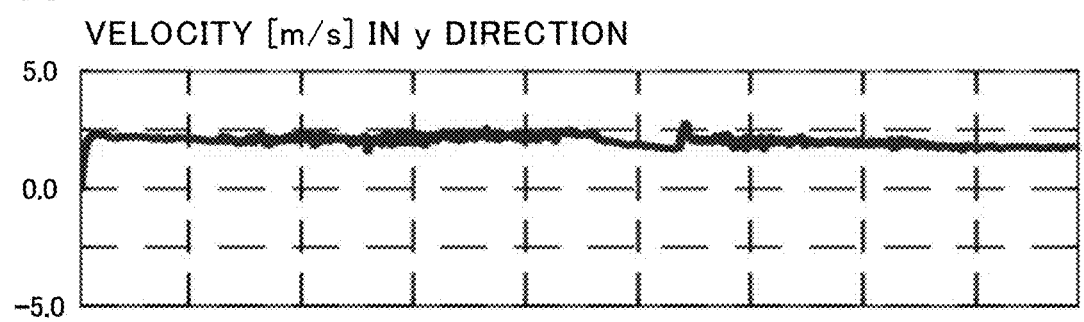
FIG. 19C is a diagram illustrating the self-position estimation result according to the present embodiment in which the velocities are calculated with the filter.
Figure 19D:
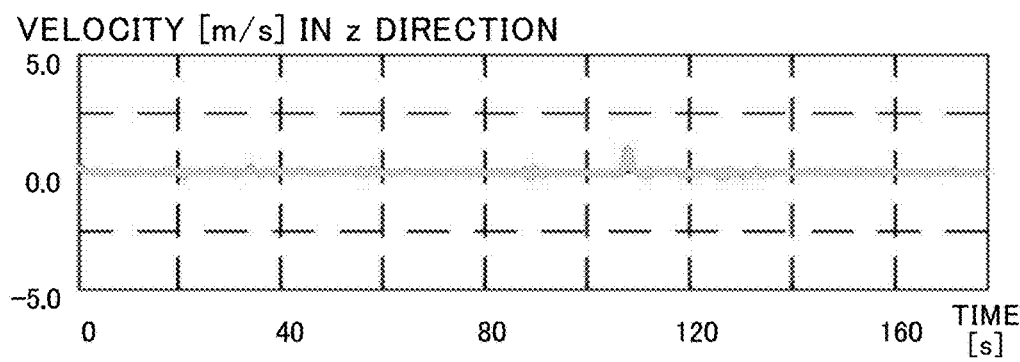
FIG. 19D is a diagram illustrating the self-position estimation result according to the present embodiment in which the velocities are calculated with the filter.
Figure 19E:
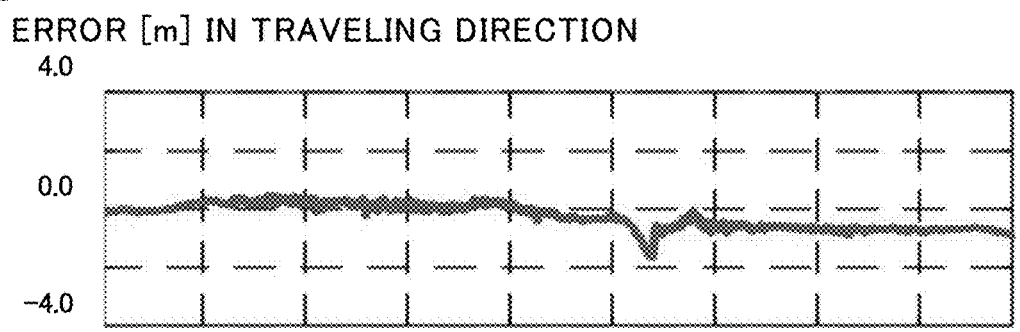
FIG. 19E is a diagram illustrating the self-position estimation result according to the present embodiment in which the velocities are calculated with the filter.
Figure 19F:
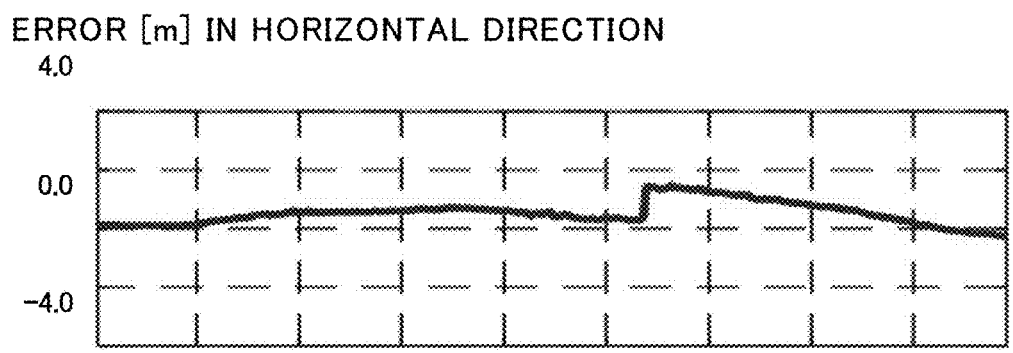
FIG. 19F is a diagram illustrating the self-position estimation result according to the present embodiment in which the velocities are calculated with the filter.
Figure 19G:
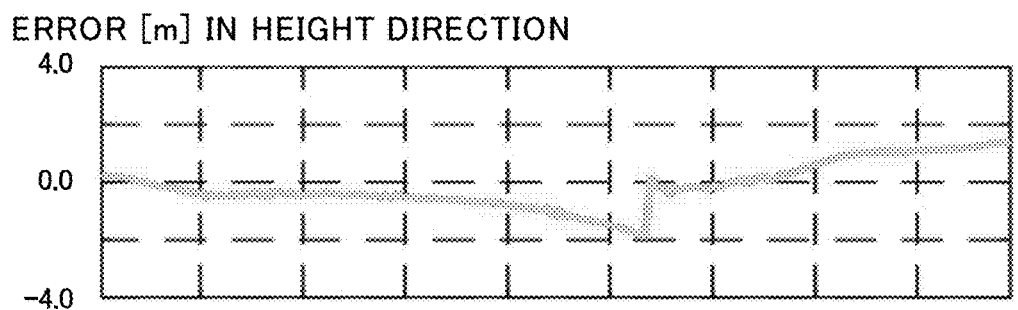
FIG. 19G is a diagram illustrating the self-position estimation result according to the present embodiment in which the velocities are calculated with the filter.
Figure 19H:
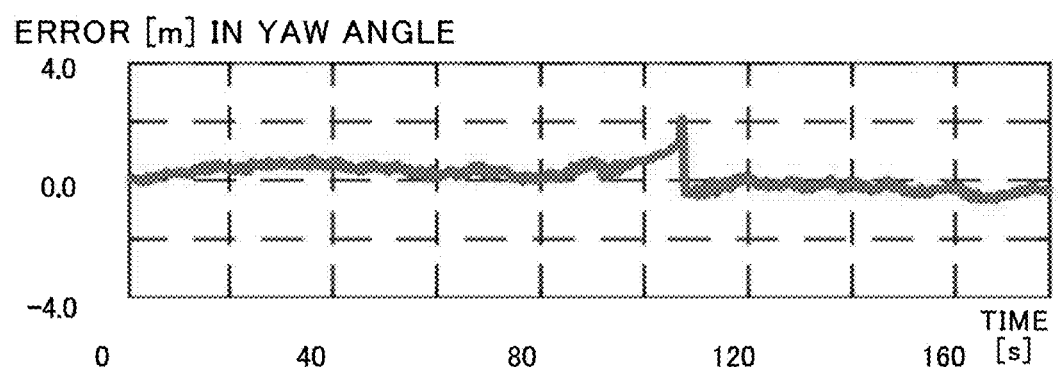
FIG. 19H is a diagram illustrating the self-position estimation result according to the present embodiment in which the velocities are calculated with the filter.

FIG. 18A to FIG. 18G and FIG. 19A to FIG. 19H are diagrams illustrating the self-position estimation results according to the embodiment in which each velocity is calculated with the filter. Here, FIG. 18A illustrates the number of measurement points before the down-sampling, FIG. 18B illustrates the down-sampling size, FIG. 18C illustrates the number of measurement points and the number of associated measurement points after the down-sampling, FIG. 18D illustrates the data association ratio DAR, FIG. 18E illustrates the score value E, FIG. 18F illustrates the reliability value NRV, and FIG. 18G illustrates the reliability index NRI, respectively. In addition, FIG. 19A illustrates the time constant τ, FIG. 19B illustrates the velocity in the x direction, FIG. 19C illustrates the velocity in the y direction, and FIG. 19D illustrates the velocity in the z direction. Moreover, with respect to the positioning results of RTK-GPS, FIG. 19E illustrates the error in the traveling direction, FIG. 19F illustrates the error in the lateral direction, FIG. 19G illustrates the error in the height direction, and FIG. 19H illustrates the error in the yaw angle, respectively.

In the experimental results according to the present embodiment, compared to the velocities in FIG. 17A to FIG. 17C, the velocities in FIG. 19B to FIG. 19D are generally smoother and the velocity turbulence around 100-120 s is reduced. As a result, in the experimental results according to the present embodiment, the errors in the estimated self-positions and the estimated self-postures are reduced as compared with the experimental results according to the comparative examples, as illustrated in FIG. 19E to FIG. 19H. In particular, for the error in the traveling direction in FIG. 19E, a large error as depicted in FIG. 17D has been suppressed, and an error amplitude up to 100 s is also reduced on average. Furthermore, as depicted in FIG. 18G, a time period in which the value of the reliability index NRI is shorter than the experimental result according to the comparative example (FIG. 16G), and thus it can be determined that a stabilization is improved as compared with the situation without the filter.

As described above, according to this embodiment, it is possible to calculate each velocity of the ship using the filter (1/(τs+1)) in which the time constant τ changes according to the reliability index NRI (reliability value NRV), and it is possible to perform the self-position estimation process using the calculated velocities of the ship. Therefore, according to the present embodiment, it is possible to improve the accuracy of the self-position estimation in the ship.

[Modifications]

Hereinafter, a description will be given of a preferred modification to the embodiment described above.

(Modification 1)

The self-position estimation unit 15 may set the time constant τ using the data association ratio DAR, instead of the reliability index NRI.

For instance, when the value of the data association ratio DAR is small, the reliability of the estimation result of the self-position estimation is considered to be unreliable and to have many errors. Therefore, when the value of the data association ratio DAR is small, the self-position estimation unit 15 according to this modification may set the value of the time constant τ to a great value.

In addition, for instance, when the value of the data association ratio DAR is great, it is considered that the reliability of the estimation result of the self-position estimation is high and the error is small. Therefore, when the value of the data association ratio DAR is great, the self-position estimation unit 15 according to this modification may set the value of the time constant τ to a small value.

That is, the self-position estimation unit 15 according to this modification can calculate the appropriate time constant τ by applying the value of the "DAR" belonging to a range which is equal to or more than 0 and equal to or less than 1 as the value of the "NRI" in the formula (24).

(Modification 2)

Instead of using the angular velocities ($\omega_x(k)$, $\omega_y(k)$ and $\omega_z(k)$) measured by the IMU 6, for instance, the self-position estimation unit 15 may calculate the angular velocities "$\varphi\cdot(k)$", "$\theta\cdot(k)$", and "$\psi\cdot(k)$" at the process number k in the world coordinate system by performing an operation using the following formulas (25) to (27). In the following formulas (25) to (27), "T" denotes the time constant, and "s" denotes a Laplace operator.

[Formula 25]
$$\dot{\phi}(k) = \frac{1}{\tau s + 1} \frac{\hat{\phi}(k) - \hat{\phi}(k-1)}{\Delta t} \quad (25)$$

[Formula 26]
$$\dot{\theta}(k) = \frac{1}{\tau s + 1} \frac{\hat{\theta}(k) - \hat{\theta}(k-1)}{\Delta t} \quad (26)$$

[Formula 27]
$$\dot{\psi}(k) = \frac{1}{\tau s + 1} \frac{\hat{\psi}(k) - \hat{\psi}(k-1)}{\Delta t} \quad (27)$$

That is, according to this modification, the self-position estimation process can be performed even in the ship without the IMU 6 by the calculation using the formulas (25) to (27).

Second Embodiment

Next, a second embodiment will be described. Incidentally, in the present embodiment, while appropriately omitting the description of the same configuration and applicable portions as in the first embodiment, it is assumed to be described with a focus on each portion different from the first embodiment.

[Overview of Driving Assistance System]

Figure 20:
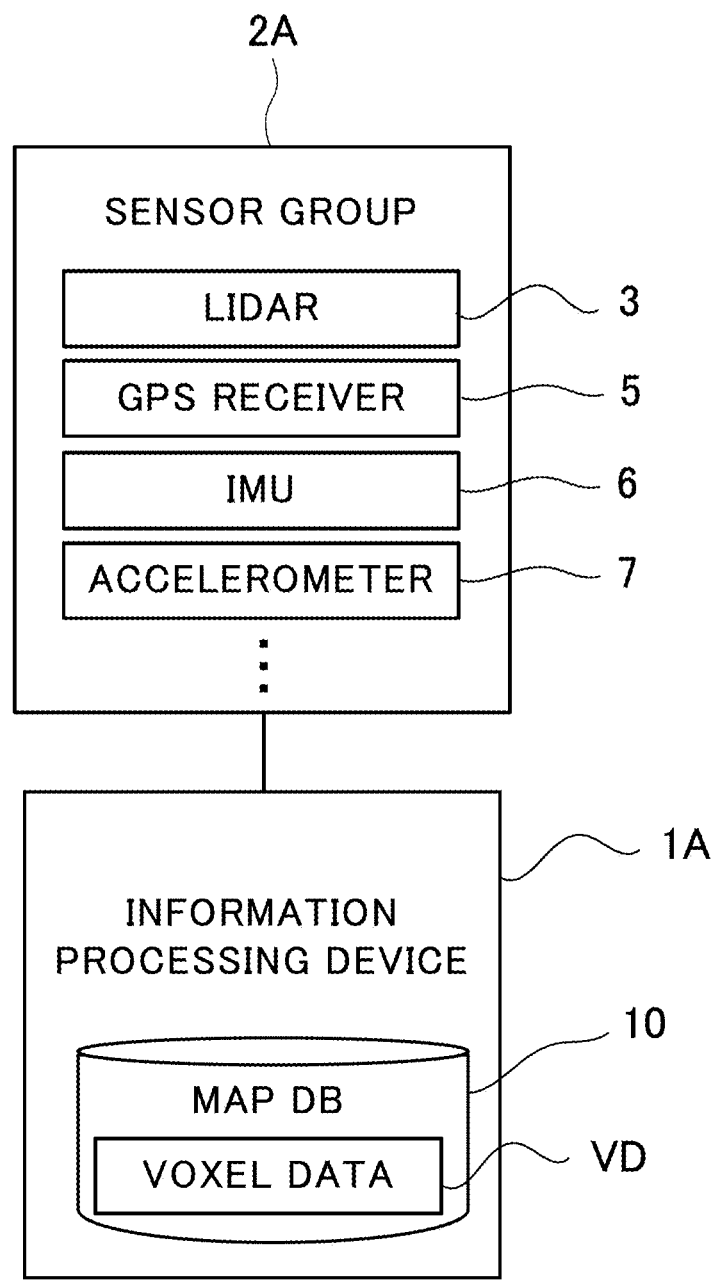
FIG. 20 is a diagram illustrating a schematical configuration of a driving assistance system according to a second embodiment.

FIG. 20 is a diagram illustrating a schematic configuration of a driving assistance system according to the second embodiment. The driving assistance system according to the present embodiment includes an information processing device 1A provided on a target ship, and a sensor group 2A mounted on the target ship.

The sensor group 2A includes various external and internal sensors provided on the target ship. In the present embodiment, the sensor group 2A includes a Lidar 3, a GPS receiver 5, a IMU 6 for measuring the angular velocities of the target ship in the three axial directions, and an acceleration sensor 7 for measuring the acceleration of the target ship in the three axial directions. According to the present embodiment, when the acceleration can be measured in the IMU 6, the acceleration sensor 7 does not need to be included in the sensor group 2A.

[Configuration of Information Processing Device]

Figure 21:
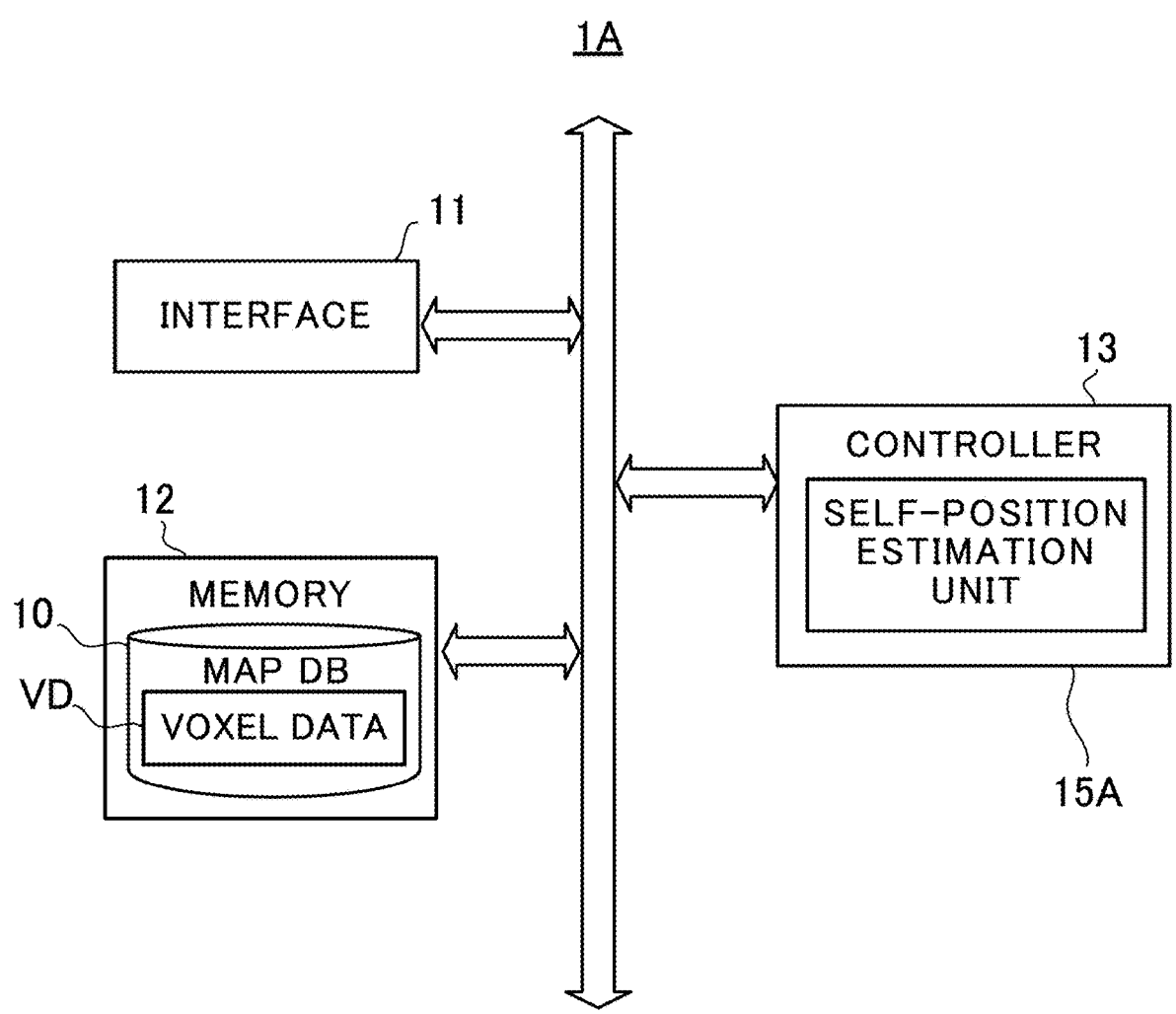
FIG. 21 is a diagram illustrating an example of a hardware configuration of an information processing device according to the second embodiment.

FIG. 21 is a block diagram illustrating an example of a hardware configuration of an information processing device according to the second embodiment. As illustrated in FIG. 21, the information processing device 1A includes a self-position estimation unit 15A, instead of the self-position estimation unit 15 of the information processing device 1.

[Functional Blocks]

Figure 22:
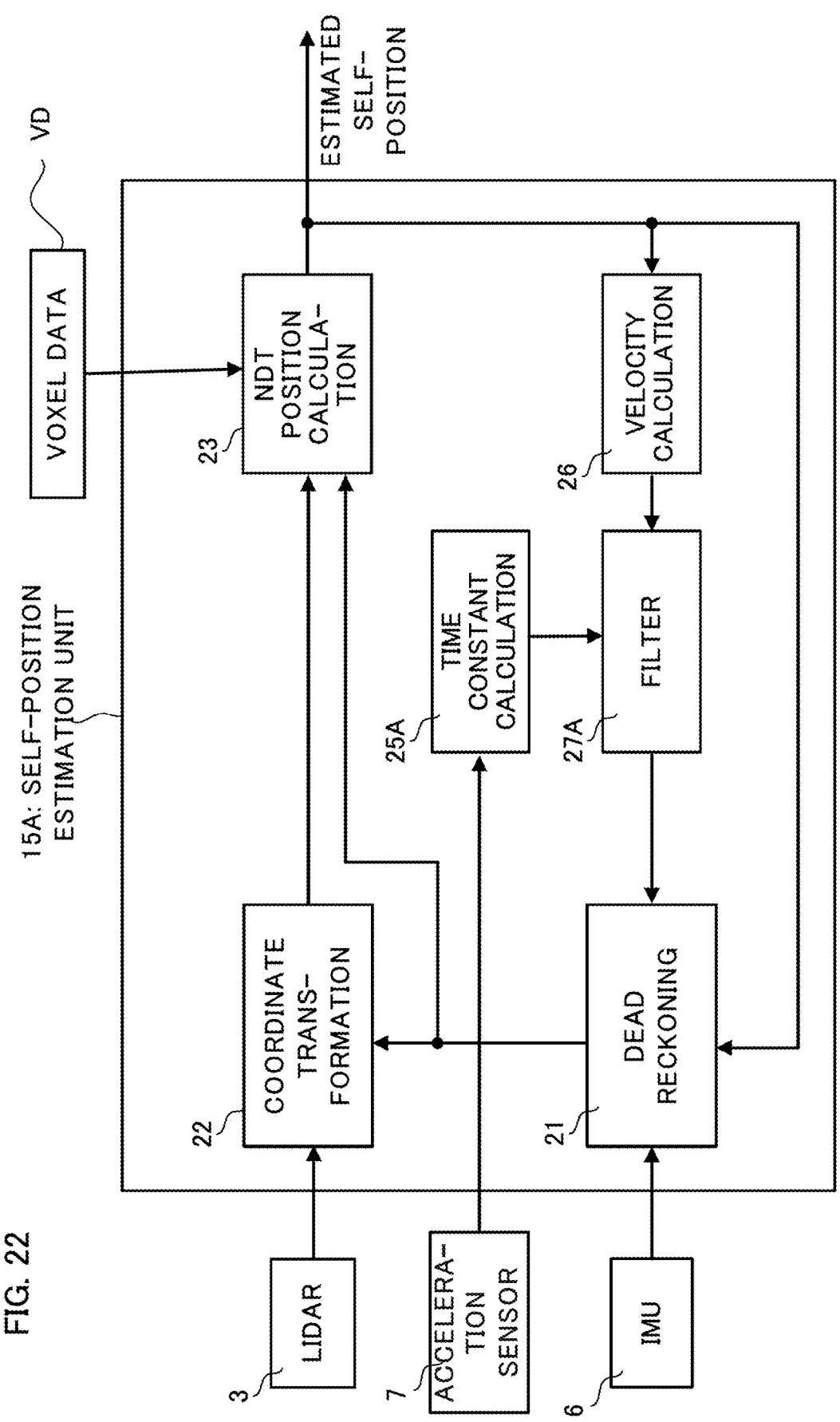
FIG. 22 is a diagram illustrating an example of functional blocks of a self-position estimation unit according to the second embodiment.

FIG. 22 is a diagram illustrating an example of functional blocks of the self-position estimation unit according to the second embodiment. As illustrated in FIG. 22, the self-position estimation unit 15A includes a dead reckoning block 21, a coordinate transformation block 22, an NDT position calculation block 23, a time-constant calculation block 25A, a velocity calculation block 26, and a filter block 27A.

The time constant calculation block 25A uses the acceleration in the three-axis direction measured by the acceleration sensor 7, and calculates the time constant $\tau_x$, $\tau_y$, and $\tau_z$ to be described later.

The filter block 27A applies a time constant "$\tau_x$", instead of the time constant "$\tau$" in the formula (16), applies a time constant "$\tau_y$", instead of the time constant "$\tau$" in the formula (17), applies the time constant "$\tau_z$", instead of the time constant "$\tau$" in the formula (18), performs an operation, thereby calculating the velocities "x·(k)", "y·(k)", and "z·(k)" at the process number k in the world coordinate system.

[Calculation of Time Constants $\tau_x$, $\tau_y$ and $\tau_z$]

Here, the method of calculating the time constants $\tau_x$, $\tau_y$ and $\tau_z$ by the self-position estimation unit 15A will be described. Note that in the following, there is no (or substantially no) displacement of a roll direction and a pitch direction, and an example will be described in which the acceleration changes on a two-dimensional plane.

Figure 23:
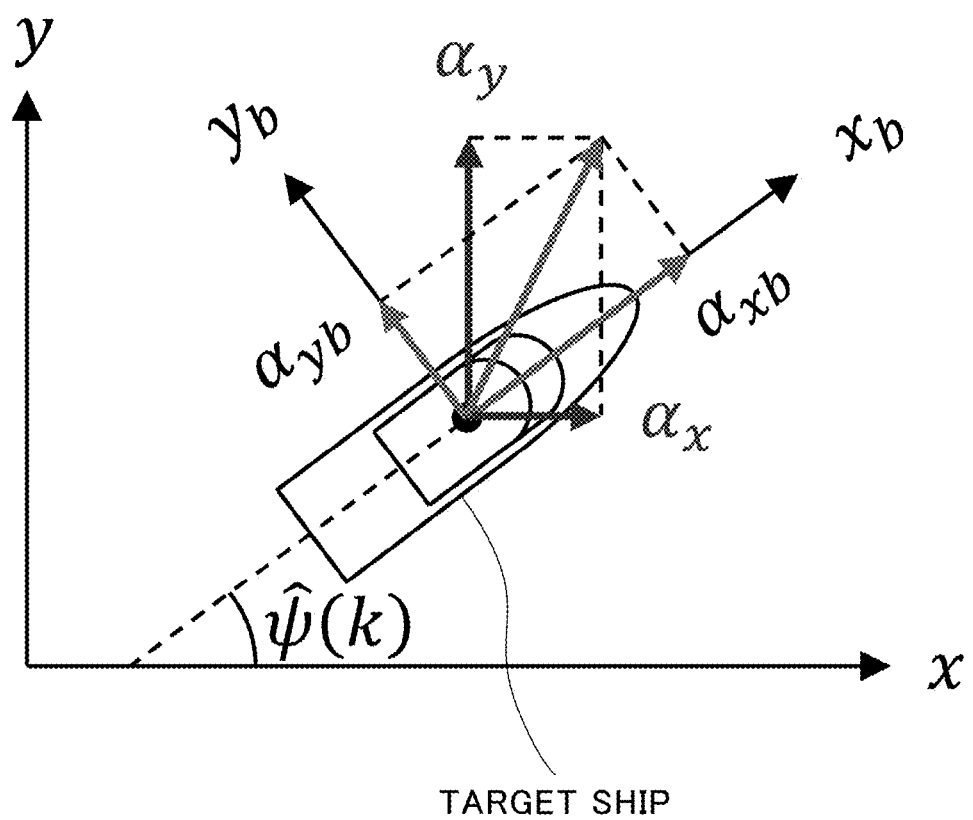
FIG. 23 is a diagram illustrating an outline of an operation performed in a case of converting accelerations measured by an acceleration sensor into accelerations in the world coordinate system.

The self-position estimation unit 15A calculates accelerations "$a_x$", "$a_y$", and "$a_z$" in the three axial directions in the world coordinate system by applying accelerations "$a_{xb}$", "$a_{yb}$", and "$a_{zb}$" in the three axial directions measured by the acceleration sensor 7 to the following formulas (28) to (30). Incidentally, the acceleration "$a_{xb}$" is an acceleration in a $x_b$ direction corresponding to the traveling direction of the target ship, the acceleration "$a_{yb}$" is an acceleration in a $y_b$ direction corresponding to the lateral direction of the target ship, and the acceleration "$a_{zb}$" is an acceleration in a $z_b$ axial direction corresponding to the vertical direction of the target ship. Moreover, for instance, an outline of the operation of the following formulas (28) to (30) can be depicted as in FIG. 23. FIG. 23 is a diagram illustrating the outline of the operation performed in a case of converting the accelerations measured by the acceleration sensor into the accelerations in the world coordinate system.

[Formula 28]
$$a_x = a_{xb} \cos \hat{\psi}(k) - a_{yb} \sin \hat{\psi}(k) \tag{28}$$

[Formula 29]
$$a_y = a_{xb} \sin \hat{\psi}(k) + a_{yb} \cos \hat{\psi}(k) \tag{29}$$

[Formula 30]
$$a_z = a_{zb} \tag{30}$$

The self-position estimation unit 15A calculates the time constants "$\tau_x$", "$\tau_y$", and "$\tau_z$" by applying the accelerations "$a_x$", "$a_y$", and "$a_z$" in the three axis directions in the world coordinate system to the following formulas (31) to (33).

[Formula 31]
$$\tau_x = 1.9 \times \exp(-|a_x|) + 0.1 \tag{31}$$

[Formula 32]
$$\tau_y = 1.9 \times \exp(-|a_y|) + 0.1 \tag{32}$$

[Formula 33]
$$\tau_z = 1.9 \times \exp(-|a_z|) + 0.1 \tag{33}$$

According to the above formula (31), for instance, when an absolute value of the acceleration "$a_x$" is small and the velocity change in the x direction is small, a time constant $\tau_x$ is calculated as a large value. Moreover, according to the above formula (31), for instance, the absolute value of the acceleration $a_x$ is large, when the velocity change in the x direction is large, the time constant $\tau_x$ is calculated as a small value.

According to the above formula (32), for instance, when the absolute value of the acceleration $a_y$ is small and the velocity change in the y direction is small, a time constant $\tau_y$ is calculated as a large value. Moreover, according to the above formula (32), for instance, when the absolute value of the acceleration "$a_y$" is large and the velocity change in the y direction is large, the time constant $\tau_y$ is calculated as a small value.

According to the above formula (33), for instance, when the absolute value of the acceleration "$a_z$" is small and the velocity change in the z direction is small, a time constant $\tau_z$ is calculated as a large value. Moreover, according to the above formula (33), for instance, when the absolute value of the acceleration "$a_z$" is large and the velocity change in the z direction is large, the time constant $\tau_z$ is calculated as a small value.

As described above, according to the present embodiment, it is possible to calculate the velocities of the ship using a filter ($1/(\tau_x s+1)$) in which the time constant Ex changes according to the acceleration $a_x$, a filter ($1/(\tau_y s+1)$) in which the time constant $\tau_y$ changes according to the acceleration $a_y$, and a filter ($1/(\tau_z s+1)$) in which the time constant $\tau_z$ changes according to the acceleration $a_z$, and to perform the self-position estimation process using the calculated velocities of the ship. Therefore, according to the present embodiment, it is possible to improve the accuracy of the self-position estimation in the ship.

(Modification)

Hereinafter, a preferred modification to the embodiment described above will be described.

The self-position estimation unit 15A may acquire the ship state information indicating the state of the target ship and calculate the time constant $\tau$ based on the acquired ship state information. Incidentally, the time constant in this modification, in a case of calculating the velocities x·(k), y·(k), and z·(k), the time constant $\tau$ may be used, instead of the time constants $\tau_x$, $\tau_y$ and $\tau_z$.

Specifically, for instance, the self-position estimation unit 15A acquires any of a variation amount SV of a throttle lever of the target ship, a change amount PV of a propeller rotational speed of the target ship, and a change amount IV of an impeller rotational speed of the target ship as a ship state information.

Next, the self-position estimation unit 15A calculates the time constant τ by substituting a value of the change amount SV, PV or IV acquired as the ship state information into "n" in the following formula (34).

[Formula 34]

$$\tau = 1.9 \times \exp(-|n|) + 0.1 \quad (34)$$

The change amount SV of the throttle lever of the target ship increases as the acceleration amount (or deceleration amount) of the target ship increases. Therefore, with respect to the value of the change amount SV substituted into "n" in the formula (34) that is large, the time constant τ is calculated as a small value.

The change amount PV of the propeller rotational speed of the target ship increases as the acceleration (or deceleration) of the target ship increases. Therefore, with respect to the value of the change amount PV substituted into "n" in the formula (34) that is large, the time constant τ is calculated as a small value.

The change amount IV of the impeller rotational speed of the target ship increases as the acceleration (or deceleration) of the target ship increases. Therefore, with respect to the value of the change amount IV substituted into "n" in the formula (34) that is large, the time constant τ is calculated as a small value.

Note that the self-position estimation unit 15A may acquire the acceleration in the traveling direction of the target ship measured by the acceleration sensor 7 as the ship state information. That is, the ship state information may include any of the variation amount SV of the throttle lever of the target ship, the change amount PV of the propeller rotational speed of the target ship, the change amount IV of the impeller rotational speed of the target ship, and the acceleration of the target ship.

Third Embodiment

Next, a third embodiment will be described. In the present embodiment, explanations of portion's to which the same configuration and the like as in the first or second embodiments can be applied will be omitted as appropriate, and explanations will focus mainly on portions which differ from both the first and second embodiments.
[Overview of Operation Assistance System]

The driving assistance system according to the present embodiment includes an information processing device 1B provided on the target ship, and a sensor group 2A mounted on the target ship.
[Configuration of Information Processing Device]

Figure 24:
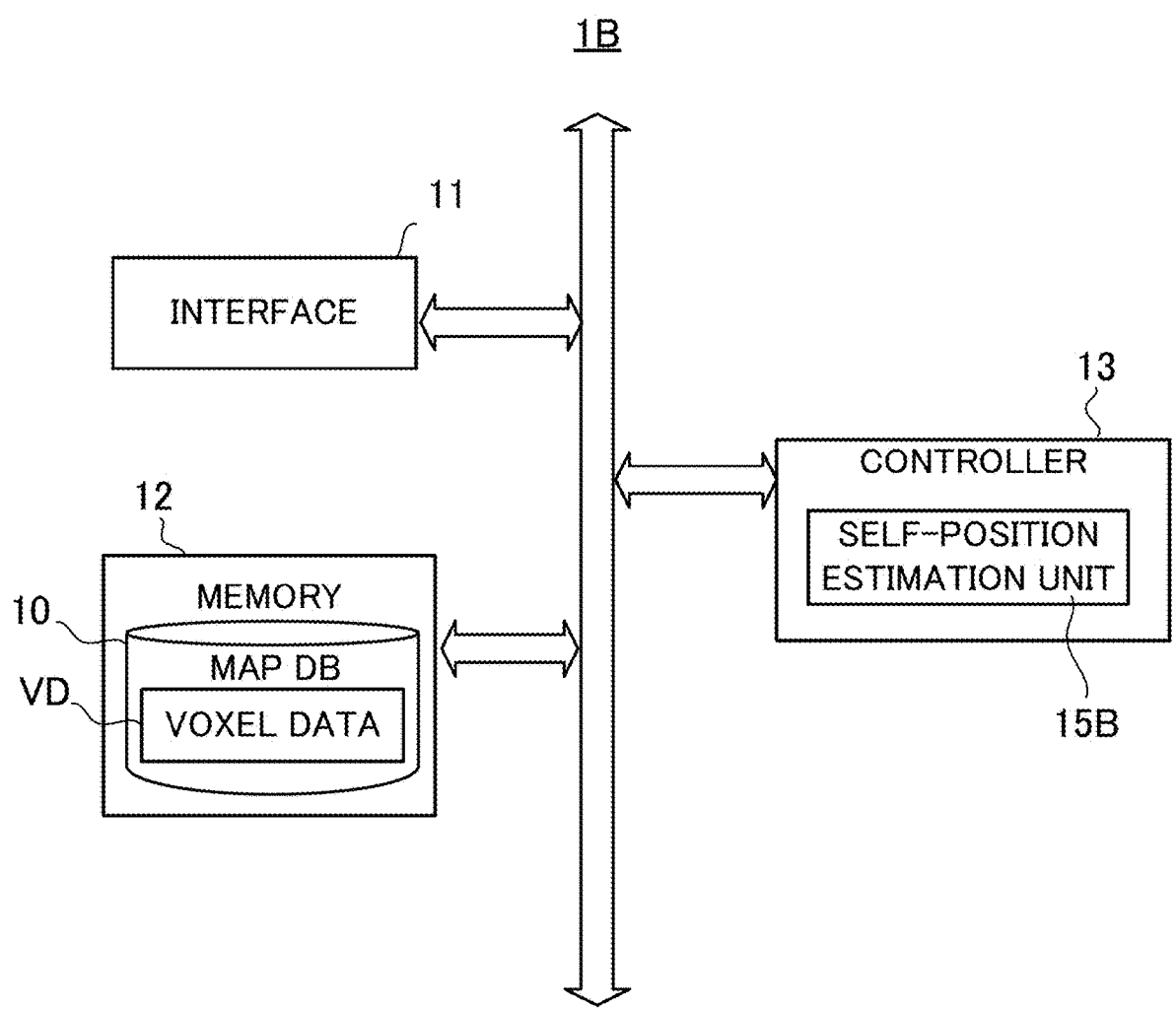
FIG. 24 is a diagram illustrating an example of a hardware configuration of an information processing device according to a third embodiment.

FIG. 24 is a block diagram illustrating an example of a hardware configuration of an information processing device according to the third embodiment. As illustrated in FIG. 24, the information processing device 1B includes a self-position estimation unit 15B, instead of the self-position estimation unit 15 of the information processing device 1.
[Functional Block]

Figure 25:
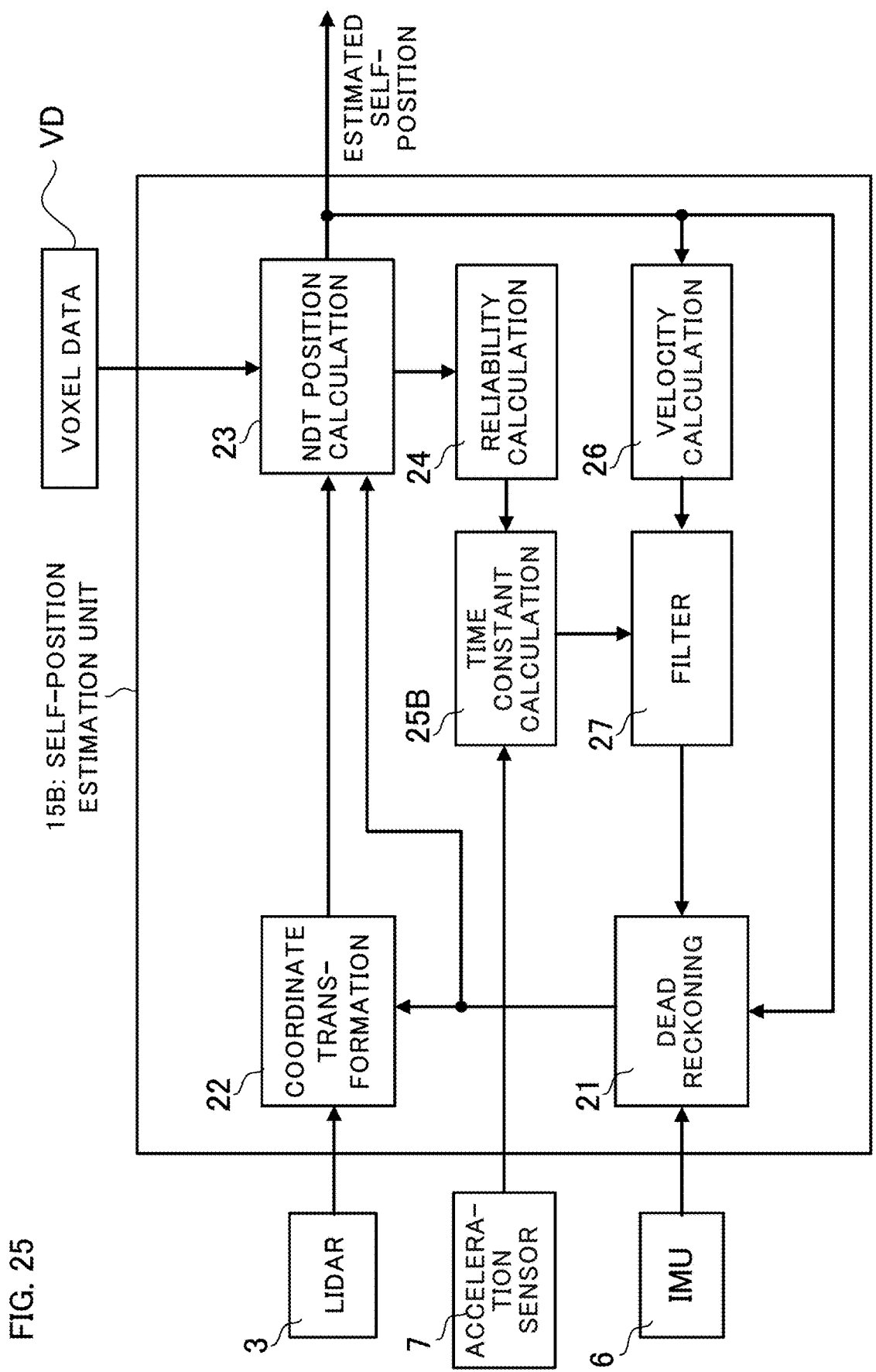
FIG. 25 is a diagram illustrating an example of functional blocks of the self-position estimation unit according to a third embodiment.

FIG. 25 is a diagram illustrating an example of functional blocks of the self-position estimation unit according to the third embodiment. As illustrated in FIG. 25, the self-position estimation unit 15B includes a dead reckoning block 21, a coordinate transformation block 22, an NDT position calculation block 23, a time constant calculation block 25B, a velocity calculation block 26, and a filter block 27.

The time constant calculation block 25B calculates the time constant τ using the reliability index NRI obtained as a process result of the reliability calculation block 24 and the accelerations measured by the acceleration sensor 7.
[Calculation of Time Constant τ]

Here, a method for calculating the time constant τ by the self-position estimation unit 15B will be described.

The self-position estimation unit 15B calculates the same time constant $\tau_t$ as that in the first embodiment by applying the reliability index NRI to the formula (24). In addition, the self-position estimation unit 15B calculates the accelerations ($a_x$, $a_y$ and $a_z$) in the three axial directions in the world coordinate system by applying the accelerations ($a_{xb}$, $a_{yb}$, and $a_{zb}$) in the three axial directions measured by the acceleration sensor 7 to the formulas (28) to (30). Moreover, the self-position estimation unit 15B calculates the same time constants $\tau_x$, $\tau_y$, and $\tau_z$ as those in the second embodiment by applying the accelerations ($a_x$, $a_y$ and $a_z$) in the three axial directions in the world coordinate system to the formulas (31) to (33). Next, the self-position estimation unit 15B obtains $(\tau_t+\tau_x)/2$ corresponding to an average value of the time constants $\tau_t$ and $\tau_x$, and $(\tau_t+\tau_y)/2$ corresponding to an average value of the time constants $\tau_t$ and $\tau_y$, and $(\tau_t+\tau_z)/2$ corresponding to an average value of the time constants $\tau_t$ and $\tau_z$, as the calculation result concerning the time constant τ.

As described above, according to the present embodiment, it is possible to calculate velocities of the ship using a filter (1/(vs+1)) in which the time constant "τ" changes depending on the reliability index NRI and the accelerations $a_x$, $a_y$ and $a_z$, and it is possible to perform the self-position estimation process using the calculated velocities of the ship. Therefore, according to the present embodiment, it is possible to improve the accuracy of the self-position estimation in the ship.

In the above-described embodiments, the programs can be stored using any of various types of non-transitory computer readable media (non-transitory computer readable media) and can be supplied to a control unit or the like such as a computer. The non-transient computer readable media include various types of tangible storage media. Examples of non-transitory computer-readable media include magnetic storage media (that is, flexible disks, magnetic tapes, hard disk drives), magneto-optical storage media (that is, magneto-optical disks), a CD-ROM (Read Only Memory), a CD-R, a CD-R/W, solid-state memories (that is, mask ROM, PROM (Programmable ROM), an EPROM (Erasable PROM) and a flash ROM, a RAM (Random Access Memory).

The present invention is described with reference to the embodiments; however, the present invention is not limited to the embodiments described above. Various changes can be made in the composition and details of the present invention that can be understood by those skilled in the art within the scope of the present invention. In other words, the present invention includes, of course, various transformations and modifications that those skilled in the art would be able to make in accordance with the entire disclosure and technical concept, including the scope of the claims. In addition, the disclosures in the patent documents cited above shall be incorporated herein by reference.

DESCRIPTION OF SYMBOLS 1, 1A, 1B Information processing device
2, 2A Sensor group
3 Lidar 5 GPS receiver
6 IMU
7 Accelerometer
10 Map DB

The invention claimed is:

1. An information processing device comprising:
a memory configured to store instructions; and
a processor configured to execute the instructions to:
   acquire a predicted position of a ship;
   calculate an estimated position of the ship in which the predicted position is updated, based on a matching between data based on an output of an external sensor provided on the ship and map data;
   calculate a reliability of the matching;
   calculate a velocity of the ship at a first process time based on the estimated position at the first process time, an estimated position at a second process time immediately before the first process time, and a time constant set depending on at least the reliability,
   wherein calculating the velocity of the ship includes applying a low-pass filter with a time constant that decreases as reliability increases to reduce position estimation errors from tidal currents and waves; and
   apply the calculated velocity of the ship to estimate positioning of the ship.

2. The information processing device according to claim 1, wherein the time constant is set as a value which decreases with a magnitude of the reliability.

3. The information processing device according to claim 1, wherein the time constant is set based on the reliability and an acceleration of the ship.

4. The information processing device according to claim 1, wherein the processor acquires the predicted position at the first process time based on the estimated position at the second process time and the velocity of the ship at the second process time.

5. The information processing device according to claim 1, wherein the processor calculates the reliability based on at least a score value indicating a degree of matching.

6. The information processing device according to claim 1, wherein
the data correspond to second point cloud data which are point cloud data for which a down-sampling is performed with respect to first point cloud data which are point cloud data output by the external sensor, and
the processor calculates the reliability based on at least a size of the down-sampling or a number of measurement points of the first point cloud data.

7. The information processing device according to claim 1, wherein the processor calculates the reliability based on at least a ratio in which the data are associated with the map data.

8. An information processing method performed by a computer, comprising:
   acquiring a predicted position of a ship;
   calculating an estimated position of the ship in which the predicted position is updated, based on a matching between data based on an output of an external sensor provided on the ship and map data;
   calculating a reliability of the matching;
   calculating a velocity of the ship at a first process time based on the estimated position at the first process time, an estimated position at a second process time immediately before the first process time, and a time constant set depending on at least the reliability,
   wherein calculating the velocity of the ship includes applying a low-pass filter with a time constant that decreases as reliability increases to reduce position estimation errors from tidal currents and waves; and
   applying the calculated velocity of the ship to estimate positioning of the ship.

9. A computer-readable program embodied on a non-transitory computer readable medium causing a computer to execute processing of:
   acquiring a predicted position of a ship;
   calculating an estimated position of the ship in which the predicted position is updated, based on a matching between data based on an output of an external sensor provided on the ship and map data;
   calculating a reliability of the matching;
   calculating a velocity of the ship at a first process time based on the estimated position at the first process time, an estimated position at a second process time immediately before the first process time, and a time constant set depending on at least the reliability,
   wherein calculating the velocity of the ship includes applying a low-pass filter with a time constant that decreases as reliability increases to reduce position estimation errors from tidal currents and waves; and
   applying the calculated velocity of the ship to estimate positioning of the ship.

* * * * *